United States Patent
Birnschein et al.

(10) Patent No.: US 11,104,394 B2
(45) Date of Patent: Aug. 31, 2021

(54) VEHICLE WITH INTERCHANGEABLE DRIVE MODULES

(71) Applicant: Zoox, Inc., Foster City, CA (US)

(72) Inventors: Timo Birnschein, Belmont, CA (US); Adriano Di Pietro, San Carlos, CA (US); Kyle Matthew Foley, Half Moon Bay, CA (US); Timothy David Kentley-Klay, Stanford, CA (US); Andrew Piper, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 16/989,609

(22) Filed: Aug. 10, 2020

(65) Prior Publication Data

US 2020/0398915 A1 Dec. 24, 2020

Related U.S. Application Data

(63) Continuation of application No. 15/674,688, filed on Aug. 11, 2017, now Pat. No. 10,737,737.
(Continued)

(51) Int. Cl.
*B62D 65/12* (2006.01)
*B60K 17/30* (2006.01)
(Continued)

(52) U.S. Cl.
CPC ......... *B62D 65/12* (2013.01); *B60H 1/00392* (2013.01); *B60H 1/00564* (2013.01);
(Continued)

(58) Field of Classification Search
CPC .......... B60K 1/00; B60K 1/02; B60K 7/0007; B60K 17/30; B60H 1/00392; B60H 1/00564; B60H 1/00642
See application file for complete search history.

(56) References Cited

U.S. PATENT DOCUMENTS

| | | | |
|---|---|---|---|
| 3,561,813 A * | 2/1971 | Barenyl | B62D 47/003 296/26.11 |
| 4,842,326 A | 6/1989 | DiVito | |

(Continued)

FOREIGN PATENT DOCUMENTS

| | | |
|---|---|---|
| DE | 10154353 | 5/2002 |
| EP | 2730488 | 5/2014 |
| WO | WO2010071539 | 6/2010 |

OTHER PUBLICATIONS

PCT Invitation to Pay Addtional Fees dated Sep. 5, 2018 for PCT application No. PCT/US2018/032433.
(Continued)

*Primary Examiner* — Faye M Fleming
(74) *Attorney, Agent, or Firm* — Lee & Hayes, P.C.

(57) ABSTRACT

Vehicles may be composed of a relatively few number of "modules" that are assembled together during a final assembly process. An example vehicle may include a body module, a first drive module coupled to a first end of the body module, and a second drive module coupled to a second end of the body module. One or both of the drive modules may include a pair of wheels, a battery, an electric drive motor, and/or a heating ventilation and air conditioning (HVAC) system. One or both of the drive modules may also include a crash structure to absorb impacts. If a component of a drive module fails or is damaged, the drive module can be quickly and easily replaced with a new drive module, minimizing vehicle down time.

20 Claims, 11 Drawing Sheets

Related U.S. Application Data

(60) Provisional application No. 62/513,197, filed on May 31, 2017.

(51) Int. Cl.

| | | |
|---|---|---|
| *B60K 1/00* | (2006.01) |
| *B60H 1/00* | (2006.01) |
| *B60W 30/184* | (2012.01) |
| *B60L 3/00* | (2019.01) |
| *B60L 3/04* | (2006.01) |
| *B60L 3/12* | (2006.01) |
| *B60W 10/08* | (2006.01) |
| *B60W 10/18* | (2012.01) |
| *B60W 10/20* | (2006.01) |
| *B60W 10/22* | (2006.01) |
| *B60W 10/30* | (2006.01) |
| *G07C 5/00* | (2006.01) |
| *B60S 9/02* | (2006.01) |
| *B60L 58/10* | (2019.01) |
| *B60Q 1/00* | (2006.01) |
| *G05D 1/00* | (2006.01) |
| *B60K 1/02* | (2006.01) |
| *B60K 7/00* | (2006.01) |
| *B60K 31/00* | (2006.01) |
| *B60L 1/02* | (2006.01) |
| *B60Q 1/04* | (2006.01) |
| *B60Q 1/24* | (2006.01) |
| *B60R 16/023* | (2006.01) |
| *B60R 16/08* | (2006.01) |
| *B62D 21/11* | (2006.01) |
| *B62D 21/12* | (2006.01) |
| *B62D 21/15* | (2006.01) |
| *G07C 5/08* | (2006.01) |
| *G05D 1/02* | (2020.01) |

(52) U.S. Cl.
CPC ......... *B60H 1/00642* (2013.01); *B60K 1/00* (2013.01); *B60K 1/02* (2013.01); *B60K 7/0007* (2013.01); *B60K 17/30* (2013.01); *B60K 31/0008* (2013.01); *B60L 1/02* (2013.01); *B60L 3/0023* (2013.01); *B60L 3/04* (2013.01); *B60L 3/12* (2013.01); *B60L 58/10* (2019.02); *B60Q 1/0035* (2013.01); *B60Q 1/04* (2013.01); *B60Q 1/24* (2013.01); *B60R 16/0231* (2013.01); *B60R 16/08* (2013.01); *B60S 9/02* (2013.01); *B60W 10/08* (2013.01); *B60W 10/18* (2013.01); *B60W 10/20* (2013.01); *B60W 10/22* (2013.01); *B60W 10/30* (2013.01); *B60W 30/184* (2013.01); *B62D 21/11* (2013.01); *B62D 21/12* (2013.01); *B62D 21/152* (2013.01); *G05D 1/0077* (2013.01); *G07C 5/008* (2013.01); *B60K 2001/001* (2013.01); *B60K 2007/0092* (2013.01); *B60L 2210/10* (2013.01); *B60L 2240/28* (2013.01); *B60L 2240/34* (2013.01); *B60L 2240/42* (2013.01); *B60W 2510/08* (2013.01); *B60W 2510/18* (2013.01); *B60W 2510/20* (2013.01); *B60W 2510/22* (2013.01); *B60W 2510/242* (2013.01); *B60W 2510/30* (2013.01); *B60W 2520/28* (2013.01); *B60W 2710/08* (2013.01); *B60W 2710/18* (2013.01); *B60W 2710/20* (2013.01); *B60W 2710/22* (2013.01); *B60W 2710/244* (2013.01); *B60W 2710/246* (2013.01); *B60W 2710/248* (2013.01); *B60W 2710/30* (2013.01); *B60Y 2200/91* (2013.01); *B60Y 2304/078* (2013.01); *G05D 1/0291* (2013.01); *G05D 2201/0213* (2013.01); *G07C 5/085* (2013.01); *G07C 5/0808* (2013.01)

(56) References Cited

U.S. PATENT DOCUMENTS

| | | | |
|---|---|---|---|
| 4,942,571 A | 7/1990 | Moller et al. | |
| 6,223,104 B1 | 4/2001 | Kamen et al. | |
| 6,276,477 B1 | 8/2001 | Ida | |
| 6,817,655 B2 * | 11/2004 | Durand | B62D 21/12 |
| | | | 296/193.03 |
| 7,096,925 B2 | 8/2006 | Bracciano | |
| 7,849,945 B2 | 12/2010 | Ross, VII et al. | |
| 9,102,331 B2 | 8/2015 | Bluethmann et al. | |
| 9,494,940 B1 | 11/2016 | Kentley | |
| 9,586,636 B1 | 3/2017 | Burmeister et al. | |
| 10,207,757 B2 | 2/2019 | Scaringe | |
| 2005/0119821 A1 | 6/2005 | Malone | |
| 2005/0230934 A1 | 10/2005 | Wilt | |
| 2006/0074500 A1 | 4/2006 | Naik et al. | |
| 2006/0112315 A1 | 5/2006 | Pfeufer et al. | |
| 2007/0055908 A1 | 3/2007 | Kubo et al. | |
| 2007/0093954 A1 | 4/2007 | Malone et al. | |
| 2016/0059738 A1 | 3/2016 | Mayer et al. | |
| 2016/0129958 A1 | 5/2016 | Byrnes et al. | |
| 2016/0207418 A1 * | 7/2016 | Bergstrom | B60G 3/08 |
| 2018/0345777 A1 | 12/2018 | Birnschein et al. | |
| 2018/0345971 A1 | 12/2018 | Birnschein et al. | |
| 2020/0385074 A1 | 12/2020 | Birnschein et al. | |
| 2020/0398915 A1 | 12/2020 | Birnschein et al. | |

OTHER PUBLICATIONS

Next future transportation inc.; "What's next?" retrieved on Apr. 24, 2017 at <<http://www.next-future-mobility.com/analysis>> 9 pages.
Non Final Office Action dated Jul. 25, 2019 for U.S. Appl. No. 15/674,688 "Vehicle With Interchangeable Drive Modules" Birnschein, 6 pages.
Final Office Action dated Jan. 24, 2020 for U.S. Appl. No. 15/674,688 "Vehicle With Interchangeable Drive Modules" Birnschein, 6 pages.
Non Final Office Action dated Sep. 25, 2019, for U.S. Appl. No. 15/674,736, "Vehicle Operation With Interchangeable Drive Modules"Birnschein, 6 pages.
PCT Search Report and Written Opinion dated Nov. 28, 2018 for PCT Application No. PCT/US2018/032433, 20 pages.

* cited by examiner

US 11,104,394 B2

VEHICLE WITH INTERCHANGEABLE DRIVE MODULES

RELATED APPLICATIONS

This application claims priority to and is a continuation of U.S. patent application Ser. No. 15/674,688, filed on Aug. 11, 2017, which claims priority to U.S. Provisional Application No. 62/513,197, filed May 31, 2017, the entire contents of both which are incorporated herein by reference.

BACKGROUND

Automobiles include a multitude of individual components and assemblies, which are manufactured by multiple different parts suppliers. The individual components and assemblies are then shipped to an assembly plant where they are assembled into a complete vehicle. Typical vehicle assembly plants may assemble thousands of individual parts and assemblies into the complete vehicle. Advances in robotics and automated assembly lines have greatly increased the speed and precision of the assembly process. However, in order to intake and assemble so many disparate parts and assemblies, typical assembly plants are large, complex, and expensive operations.

Many automakers today design platforms of vehicles which share some common parts. This strategy, known as platforming, allows the automakers to benefit from reduced overall part cost due to economies of scale. In some instances platforming may also allow a single assembly plant to be used to assemble multiple different vehicles that are part of the same platform. However, different models of vehicles that are part of a same platform still typically include numerous parts and assemblies that are unique to the particular model of vehicle.

Additionally, when a component of a vehicle made by the above process fails or the vehicle needs service, the process of repairing or replacing the failed component or otherwise servicing the vehicle is often a complex process requiring specialized skill or training. Thus, the vehicle is typically taken to a repair shop where the repair may take several hours, days, or even weeks, depending on the nature of the service needed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
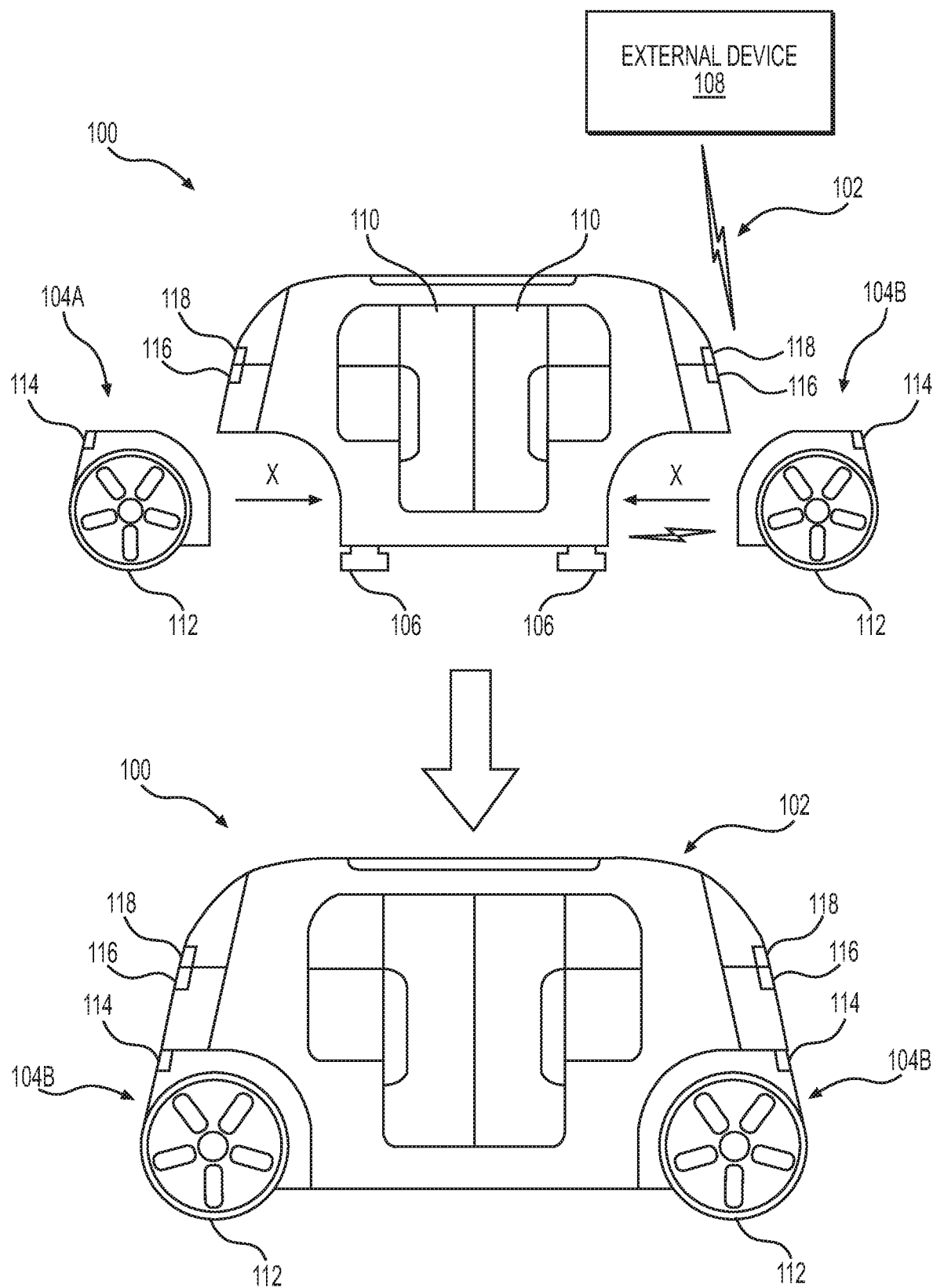
FIG. 1 is a schematic view of an example vehicle comprising a body module and a pair of drive modules disposed at opposite ends of the body module.

As discussed above, modern vehicle assembly plants use robotics and automated assembly lines to assemble thousands of individual parts and assemblies into a complete vehicle. Even when manufacturers make use of platforming, vehicles that are part of a same platform still typically include numerous parts and assemblies that are unique to the particular model of vehicle. To intake and assemble so many disparate parts and assemblies, typical assembly plants are large, complex, and expensive operations. For example, assembly plants typically must maintain inventories of parts for numerous disparate vehicles. This inventory takes space and inventory tracking systems are needed to keep track of all of the different parts.

Additionally, vehicles made using traditional manufacturing and assembly processes are difficult to service. Each different vehicle make and model has a different combination of components and assemblies. If a vehicle component fails or needs service, the vehicle is typically taken to a repair shop, and the repair shop determines the parts that are needed for the service. In many cases, the repair shop may not stock the needed parts in inventory and may need to order the parts. Once the needed parts are obtained, a portion of the vehicle typically needs to be disassembled in order to remove and replace the failed part. This process is complicated, time consuming, and requires specialized training.

This application describes vehicles composed of a relatively few number of assemblies or "modules" that are assembled together during a final assembly process. For instance, in some examples, vehicles may be assembled from two main types of modules, a body module and a drive module (e.g., one drive module at each end of the body module). Thus, the vehicle assembly plant can be very simple, compact, and inexpensive to construct and maintain. Also, because the assembly involves only a few modules, inventory management at the vehicle assembly plant is simplified since the assembly plant need only maintain inventory of the few modules used to assemble the vehicle.

If multiple different models of vehicle are to be assembled, each model of vehicle may have a different body module, but the vehicles may share a common drive module across the different models. This allows production of the drive modules to benefit from economies of scale. Moreover, use of the same drive modules across multiple different models of body modules allows for flexibility in meeting changes in demand. For instance, if demand changes from one model to another, the same drive modules may be used for either model. Only the number of the various body modules needed changes.

In some examples, the vehicles may be constructed so that substantially all major systems of the vehicle are located on the drive modules. For instance, each of the drive modules may include some or all of the following: a propulsion system, power supply system and related electronics, steering system, braking system, suspension system, heating ventilation and air conditioning (HVAC) system, and related controls and actuators for the forgoing systems. In some examples, the drive modules may also include exterior lighting, body panels, facia, and/or sensors. Including all of the major systems of the vehicle on the drive module maximizes the economies of scale for all of the included systems. Including all of the major systems of the vehicle on the drive module also simplifies the construction of the body module. This is beneficial because it allows for faster and easier construction of the body modules which are typically larger and more cumbersome to handle. Also, because fewer of each body module are manufactured, they benefit less from economies of scale and thus it is preferable to simplify their construction as much as possible.

The individual modules may be manufactured separately at specialized module manufacturing facilities. These module manufacturing facilities may be optimized to manufacture the particular module allowing them to manufacture the modules more efficiently and precisely. For instance, due to the smaller size of the drive modules relative to the overall size of the vehicle, a more compact assembly process may be used to assemble the drive modules. Because the major systems of the vehicle are included in the drive modules, many adjustments and settings that are typically done during final assembly can be done during assembly of the drive module prior to delivery to the final assembly plant. For instance, alignment of wheels and lighting, and functional testing of the major systems can all be completed at the drive module manufacturing facility. This further simplifies and speeds up the final vehicle assembly process.

The modular construction of the vehicles described herein greatly improves their reliability. For instance, in examples in which each drive module includes all major systems of the vehicle, the vehicle will include at least two instances of every major system, thereby providing redundancy. This redundancy enable the device to remain operational despite failure of a major system or component of the vehicle. That is, if one instance of a system on one derive module fails or needs service, the other instance of the system on the other drive module remains functional allowing the vehicle to continue operating. In that sense, the vehicle is "fail operational." By way of example and not limitation, if a drive motor of a first drive module fails, the failed drive module may be disconnected and the vehicle may continue to operate under the power of a drive motor of a second drive module until such time as the first drive module can conveniently be serviced.

The modular construction of the vehicles described herein also greatly improves their serviceability. For instance, in the event of a failure or fault with a component or system of a drive module, the drive module can simply be removed and replaced with another drive module, getting the vehicle back in service quickly. In some examples, replacing a module of a vehicle may be done in the field (e.g., on the side of the road or in a parking lot) and then the removed module may be taken to a shop for service in a more favorable environment. Both drive modules and body modules may be replaced in this fashion. For instance, if a fault occurs with a motor, battery, or other major system of a drive module, the drive module may simply be removed from the vehicle and replaced with another drive module. Conversely, if a body module has a fault (e.g., a side impact collision, a faulty door mechanism, etc.) the two drive modules may be removed from the faulty body module and reattached to a new body module. The replacement of a module may be performed by service personnel, an automated service robot, or a combination of both. The modules themselves may store a manifest including a list of the specific parts (e.g., model number, version, etc.) installed on the module, and a diagnostic module including a fault log indicating the faulty component(s) and/or sensor readings or other circumstances leading up to the fault, to assist service personnel in diagnosing and repairing the module.

In addition to improved serviceability, the modular design of the vehicles described herein also allows for more efficient use of space allowing for much more compact vehicles. For instance, because individual components of the vehicle are not serviced while assembled to the vehicle, many components of the vehicle can be packaged such that they have minimal or no clearance or are inaccessible while the module is installed on the vehicle. That is, hand access and service clearance does not need to be accounted for while the module is installed on the vehicle, since the servicing will be conducted with the module unmarried from the vehicle.

While the above examples describe replacing a drive module of a vehicle in order to service the drive module, in another example, drive modules may be removed to upgrade and/or replenish components. In several examples, a drive module may be swapped out for a drive module containing new brake systems, new power units, new HVAC systems, new sensor systems, or the like. In such examples, increased functionality of the vehicle may be tested without the need to build an entirely new vehicle. In an example of replenishing components, a drive module having a low battery charge may be swapped with a drive module having a fully charged battery. In this way, vehicles need not be taken out of service in order to charge their batteries, refill fluids, pressurize components, and the like, thus maximizing vehicle up time.

By way of example and not limitation, vehicles according to this application may include a body module, a first drive module coupled to a first end of the body module, and a second drive module coupled to a second end of the body module. The body module may include a passenger compartment to house one or more passengers. The body module also includes a vehicle computing device to control operation of the vehicle. In some examples, the first drive module and the second drive module are substantially identical, while in other examples they may be different from each other. The first drive module and/or the second drive module in this example include a drive module frame to which are mounted first and second wheels, an electric drive motor, and a heating ventilation and air conditioning (HVAC) system. The electric drive motor is coupled to the drive module frame and to the first and second wheels to drive at least one of the first and second wheels. The HVAC system is disposed in or on the drive module frame to provide temperature controlled air to the passenger compartment of the body module via one or more air ducts or connections. A power supply is disposed in the drive module and electrically coupled to the electric drive motor and the HVAC system to provide power to the electric drive motor and the HVAC system. A drive module control system is communicatively coupled, by wired or wireless connection, to the vehicle computing device of the body module. The drive module control system is configured to control operation of the electric drive motor and the HVAC system based at least in part on signals received from the vehicle computing device.

In some examples, the first drive module and/or the second drive module may additionally or alternatively include a steering assembly coupled to the first and second wheels to steer the first and second wheels, a braking assembly coupled to the first and second wheels to brake the first and second wheels, a suspension assembly to movably couple the first and second wheels to the drive module frame, one or more exterior body panels or fascia of the vehicle, and/or one or more exterior lights of the vehicle. The vehicle may also include one or more sensors to sense objects surrounding the vehicle or conditions of the vehicle. These sensors may be located on the body module, the drive modules, or some sensors may be located on the body module while other sensors are located on the drive modules. Examples of sensors that may be included on the body module, the drive modules, or both include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like.

In some examples, a crash structure of the vehicle may be built into the drive modules. Thus, if a vehicle is involved in a collision, the impacted drive module may absorb the impact minimizing damage to the body module and the other drive module. In that case, the impacted drive module may be removed and replaced with a new drive module, putting the vehicle back into service quickly. When included, the crash structure may be coupled to the drive module frame. The crash structure is configured to crumple or collapse responsive to an impact force exceeding an impact threshold to absorb the impact force. In some examples, the crash structure may comprise one or more extruded rails constructed of material and sized and shaped so as to crush substantially smoothly and continuously responsive to an impact. In some examples, the crash structure may comprise a pair of generally rectangular tubular or C-shaped crash rails. In some examples, the crash structure may be made of a relatively ductile metal, such as aluminum.

One or more brackets may be used to couple the crash structure to the body module. In that case, a first end of the one or more brackets may be coupled to the crash structure and a second end of the one or more brackets may be coupled to the body module. The second end of the one or more brackets may be made to have a larger surface area than a surface area of the first end of the one or more brackets in order to distribute impact forces transferred by the crash structure to the larger area of the body module. In this way, damage to the body module may be minimized and, in many cases, damage caused by the impact may be isolated to the impacted drive module.

The drive modules may be coupled to the body module via a connection interface. In some examples, a first connection interface may be used for coupling the first drive module to the first end of the body module, and a second connection interface may be used for coupling the second drive module to the second end of the body module. The first connection interface and/or the second connection interface may include one or more mechanical connectors, electrical connectors, fluid connectors, and/or air connectors. The mechanical connector(s) mechanically connect the body module to a respective one of the drive modules. The mechanical connector(s) may include one or more bolts, rivets, quick connects, cam locks, lever latch connectors, or other fasteners. The mechanical connector also includes one or more alignment guides to align the body module relative to the respective one of the drive modules. The electrical connector(s) electrically connect the body module to the respective one of the drive modules. The electrical connector(s) may include low voltage and/or high voltage connections. The fluid connector(s) fluidically connect the respective one of the drive modules to the body module and/or the other drive module. The fluid connections may be used to transmit brake fluid, transmission fluid, suspension fluid, coolant, window cleaner, other liquids, or the like. The air connector(s) provide passages through which to receive temperature controlled air from the HVAC system of the respective one of the drive modules. Additionally or alternatively the air connector(s) may provide passages for compressed air from a compressor of the respective drive module to the body module and/or the other drive module. The compressed air may be used in connection with an air suspension system, door opening/closure mechanisms, or the like. The electrical connector(s), fluid connector(s), and/or air connector(s) may be blind mating connectors that securely contact/seal with complementary connectors on the drive modules when the mechanical connection(s) are engaged.

These and other aspects are described further below with reference to the accompanying drawings. The drawings are merely example implementations, and should not be construed to limit the scope of the claims. For example, while the example vehicles are shown and described as being autonomous vehicles that are capable of navigate between locations without human control or intervention, techniques described herein are also applicable to non-autonomous and/or semi-autonomous vehicles. Also, while the vehicle is illustrated as having a coach style body module, other body modules are contemplated. Body modules configured to accommodate any number of one or more passengers (e.g., 1, 2, 3, 4, 5, 6, 7, 8, etc.) are contemplated. Additionally, while the example body modules shown include a passenger compartment, in other examples the body module may not have passenger compartment (e.g., in the case of a cargo vehicle, delivery vehicle, construction vehicle, etc.).

Example Modular Vehicle Architecture

FIG. 1 is a schematic view of an example vehicle 100 comprising a body module 102 and a pair of drive modules, namely first drive module 104A and a second drive module 104B. FIG. 1 illustrates the vehicle 100 in an unassembled state (at the top of the page) and an assembled state (at the bottom of the page). In the unassembled state shown at the top of the page, the body module 102 is supported by supports 106. The supports 106 may comprise jacks (e.g., hydraulic jacks, screw jacks, scissor jacks, pneumatic cylinders, etc.) that are built into an underside of the body module 102. In that case, the supports 106 may be operated (i.e., extended and retracted) manually by an operator or automated services robot, or automatically when vehicle power is available (e.g., when a battery is provided on the body module, when one or more drive modules are installed, and/or when auxiliary power is available from an automated services robot for example). Bottom surfaces of the supports 106 are shown in this example as being flat surfaces. However, in other examples, one or more of the supports 106 may comprise casters or other wheels to allow the body module 102 to be moved or repositioned during installation or removal of the drive modules. In some examples, such supports 106 need not be built into the vehicle and may, instead be built into a service center, or the like.

During installation, in this example, the drive modules 104A and 104B are installed by moving them toward the body module 102 in a longitudinal or "X" direction of the vehicle 100, as shown by the horizontal arrows in FIG. 1. As discussed in further detail below with reference to FIG. 10, in some examples, the drive modules 104A and 104B may be moved into position by driving them under their own power. In that case, the drive modules 104A and 104B may be driven into position under their own control, under control of a vehicle controller of the body module, or under control of an external device 108 such as, for example, a remote control device (e.g., operated by an installer or technician), a teleoperations computing device, or a computing device of an automated services robot. In other examples, however, the drive modules 104A and 104B may be manually placed into position for attachment by an installer/technician or an automated service robot. In some examples, regardless of how the drive modules 104A and 104B are controlled, a stabilization algorithm may be employed such that either drive module 104A and/or 104B remain in an upright orientation to be received by the body module 102, despite being unconnected. Such a stabilization algorithm may be provided by any one or more of a computing device located in the vehicle body module, a teleoperations computing device, a remote control computing device, or a microcontroller/computing device located on the drive module 104A or 104B.

In some examples, mating the drive modules 104A and 104B with the body module 102 in the X-direction may have benefits such as ease of installation and/or removal, since the body module 102 need not be elevated in order to remove and/or install the drive modules 104A and 104B. Additionally or alternatively, in some examples, mating in the X-direction means that connection points between the drive modules 104A and 104B with the body module 102 are generally aligned with the direction of travel of the vehicle and, hence, the direction of potential impact in the case of a collision. Thus, any impact forces applied to the longitudinal ends of drive modules 104A and 104B will generally result in compressive forces substantially aligned with the connection points, thereby minimizing stresses on the connection points during a collision.

Once either the drive modules 104A or 104B are in position adjacent first or second ends, respectively, of the body module 102, they are coupled to the body module 102 by one or more mechanical connectors. Such coupling may be performed simultaneously, successively, or individually. Example mechanical connectors that may be used to couple the drive modules 104A and 104B to the body module 102 are described in detail below with reference to FIG. 5. Once the drive modules 104A and 104B are coupled to the body module 102, the supports 106 may be retracted (manually or automatically under vehicle power) and the vehicle 100 is assembled as shown at the bottom of FIG. 1 and ready to drive.

In this example, the vehicle 100 is a bidirectional vehicle and the first drive module 104A and the second drive module 104B are substantially identical to one another. As used herein, a bidirectional vehicle is one that is configured to switch between traveling in a first direction of the vehicle and a second, opposite, direction of the vehicle. In other words, there is no fixed "front" or "rear" of the vehicle 100. Rather, whichever longitudinal end of the vehicle 100 is leading at the time becomes the "front" and the trailing longitudinal end becomes the "rear." In other examples, the techniques described herein may be applied to vehicles other than bidirectional vehicles. Also, whether or not the vehicle is bidirectional, the first drive and second drive modules may be different from one another. For example, one drive module may have a subset of the features of the other drive module. In one such example, the first module may include a first, comprehensive set of vehicle systems (e.g., drive motor, battery, steering system, braking system, suspension system, HVAC, sensors, lights, body panels, facia, etc.) while the second drive module includes a limited subset of vehicle systems (e.g., suspension system, braking system, sensors, lights, and facia). In other examples, the drive modules may have one or more distinct or mutually exclusive vehicle systems (e.g., one drive module has an HVAC system and the other drive module has a drive motor). As another non-limiting example of such, one module may have an HVAC system while the other drive module has a newer HVAC system having a higher efficiency.

As shown this example, the body module 102 includes a passenger compartment with an opening for ingress and egress of passengers. The opening is covered by a pair of doors 110. The doors 110 may be opened manually or automatically by actuators in the body module 102. One or more speakers, lights, and/or interfaces (e.g., physical buttons, switches, controls, microphones, and/or displays including one or more graphical interfaces) may be disposed within the passenger compartment of the body module 102 to receive input from, and provide output to, one or more passengers of the vehicle 100. The body module 102 also includes several windows and a sunroof or moon roof, which are unnumbered in this figure. The windows and/or the sun/moon roof may open manually, automatically, or may not be openable. The body module 102 also includes a vehicle computing device (not shown in this figure) to control operation of the vehicle 100. Details of an example vehicle computing device usable with the vehicle 100 are described below with reference to the example computing architecture of FIG. 4.

The drive modules 104A and 104B include wheels 112 and one or more vehicle systems (e.g., propulsion systems, power systems, steering systems, braking systems, suspension systems, and/or other systems) which are not shown in this figure. Details of an example drive module that is suitable for use as drive modules 104A and 104B are described with reference to FIGS. 6 and 7. However, other drive module configurations may alternatively be used for drive modules 104A and 104B.

The vehicle 100 may also include one or more sensors to sense objects surrounding the vehicle or conditions of the vehicle and/or one or more emitters to emit light or sound into a surrounding of the vehicle. These sensors and/or emitters may be located on the body module 102, the drive modules 104A and 104B, or both. In this example, the sensors and emitters are illustrated representatively by reference numbers 114, 116, and 118. Each of these reference numbers (114, 116, and 118) may correspond to a sensor, an emitter, or a combination of sensors and emitters. However, it should be understood that vehicles according to this disclosure may include more or fewer sensors and/or emitters than those shown by reference numbers 114, 116, and 118, and the locations of the sensors and/or emitters may be positioned at additional or alternative locations on the body module, the drive module, or some combination thereof. Examples of sensors that may be represented by reference numbers 114, 116, and/or 118 include, without limitation, ultrasonic sensors, radar sensors, light detection and ranging (LIDAR) sensors, cameras, microphones, inertial sensors (e.g., inertial measurement units, accelerometers, gyros, etc.), global positioning satellite (GPS) sensors, and the like.

Examples of emitters that may be represented by reference numbers 114, 116, and/or 118 include, without limitation, lights to illuminate a region generally in front or behind the vehicle (e.g., head/tail lights), lights to signal a direction of travel or other indicator of vehicle action (e.g., indicator lights, signs, light arrays, etc.), one or more audio emitters (e.g., speakers, speaker arrays, horns, etc.) to audibly communicate with pedestrians or other nearby vehicles.

In one nonlimiting example, reference number 114 may be disposed on the drive modules 104A and 104B and represent lights to illuminate a region generally in front or behind the vehicle (e.g., head/tail lights), reference number 116 may be disposed on the body module and may represent a group of sensors, such as LIDAR sensors and cameras, and reference number 118 may be disposed on the body module 102 and may represent arrays of audio and visual emitters. However, as discussed throughout, this is but one example and additional or alternative sensors and/or emitters may be included on the body module 102, the drive modules 104A and 104B, or both.

Figure 2:
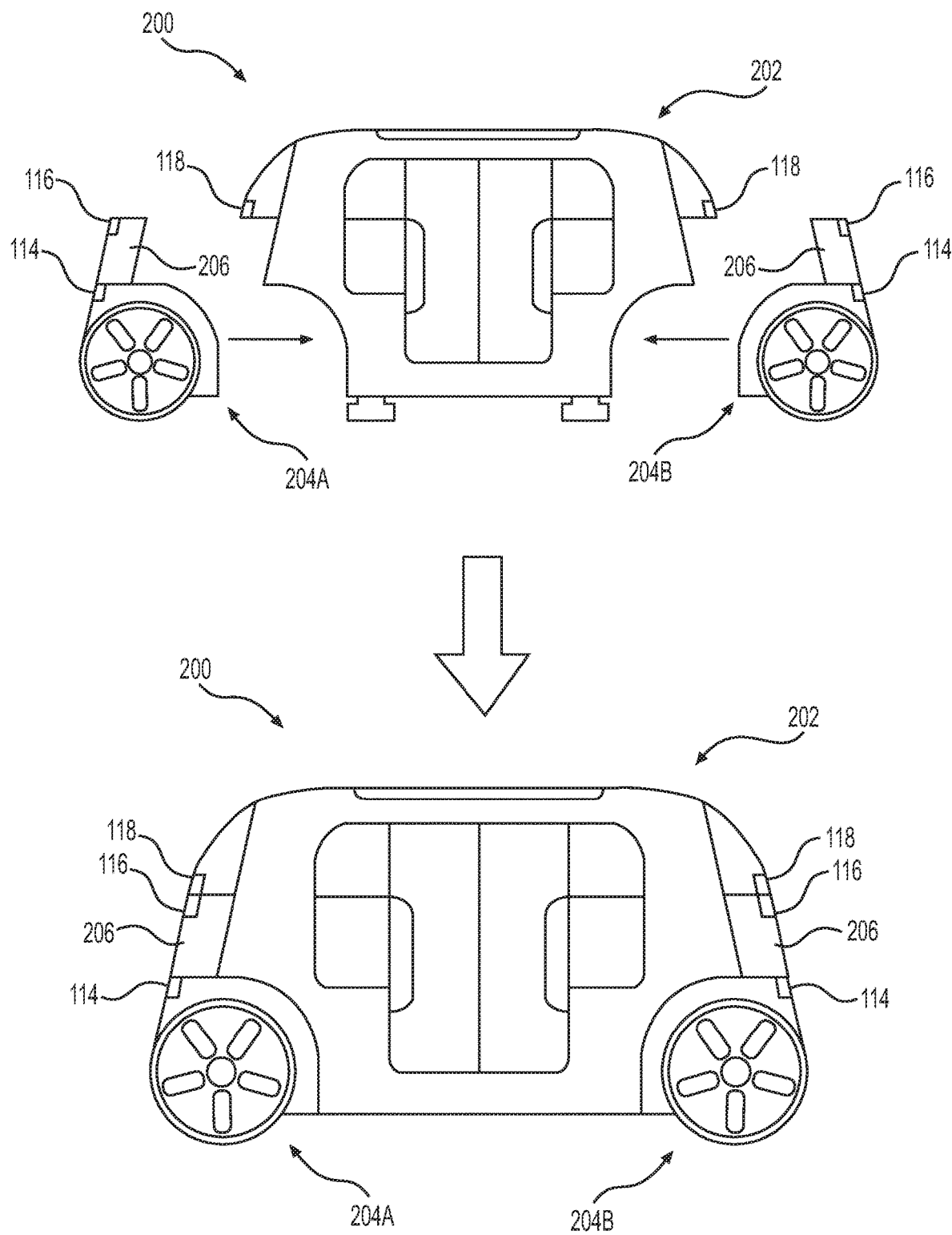
FIG. 2 is a schematic view of another example vehicle comprising a body module and a pair of drive modules disposed at opposite ends of the body module.

FIG. 2 is a schematic view of another example vehicle 200 comprising a body module 202 and a pair of drive modules, namely a first drive module 204A and a second drive module 204B, disposed at opposite ends of the body module 202. This example is similar to that of FIG. 1 except for the split between the body module 202 and the drive modules 204A and 204B. In this example, a lower portion of a windscreen and/or body panel 206 is included as part of the drive modules rather than as part of the body module 202 as was the case in FIG. 1. As a consequence, in this example, the sensors represented by reference number 116 is included as part of the drive modules 204A and 204B rather than as part of the body module 202.

Figure 3:
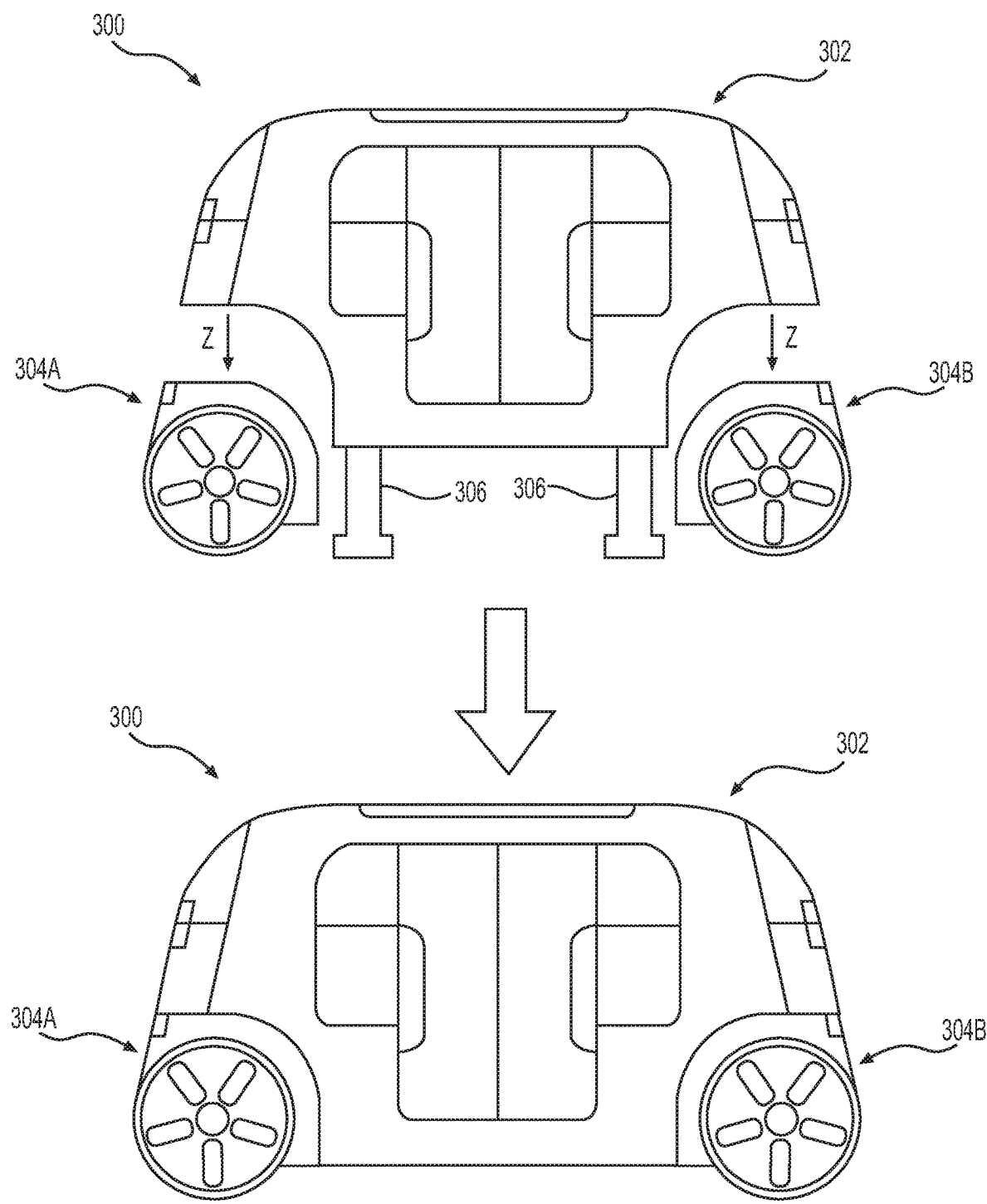
FIG. 3 is a schematic view of yet another example vehicle comprising a body module and a pair of drive modules disposed at opposite ends of the body module, showing an alternate assembly technique.

FIG. 3 is a schematic view of yet another example vehicle 300 comprising a body module 302 and a pair of drive modules, namely a first drive module 304A and a second drive module 304B, disposed at opposite ends of the body module 302. This example is similar to that of FIG. 1 except that the drive modules 304A and 304B mount to the body module 302 in a vertical or "Z" direction. In this example, supports 306 may elevate or raise the body module 302, and the drive modules 304A and 304B may be moved into position (manually or under their own power) below first and second ends of the body module 302. The supports 306 may then be lowered to set the body module 302 onto the drive modules 304A and 304B. This process may be performed for both drive modules 304A and 304B simultaneously, or one drive module 304A may be installed/replaced and then the process may be repeated to install/replace the other drive module 304B. One advantage of mating the drive modules 304A and 304B to the body module in the Z-direction is that this technique allows the drive modules 304A and 304B to have components (e.g., HVAC components, shock/strut mounts, etc.) protruding from a top thereof into a cavity in the body module 302.

Example Computing Architecture

Figure 4:
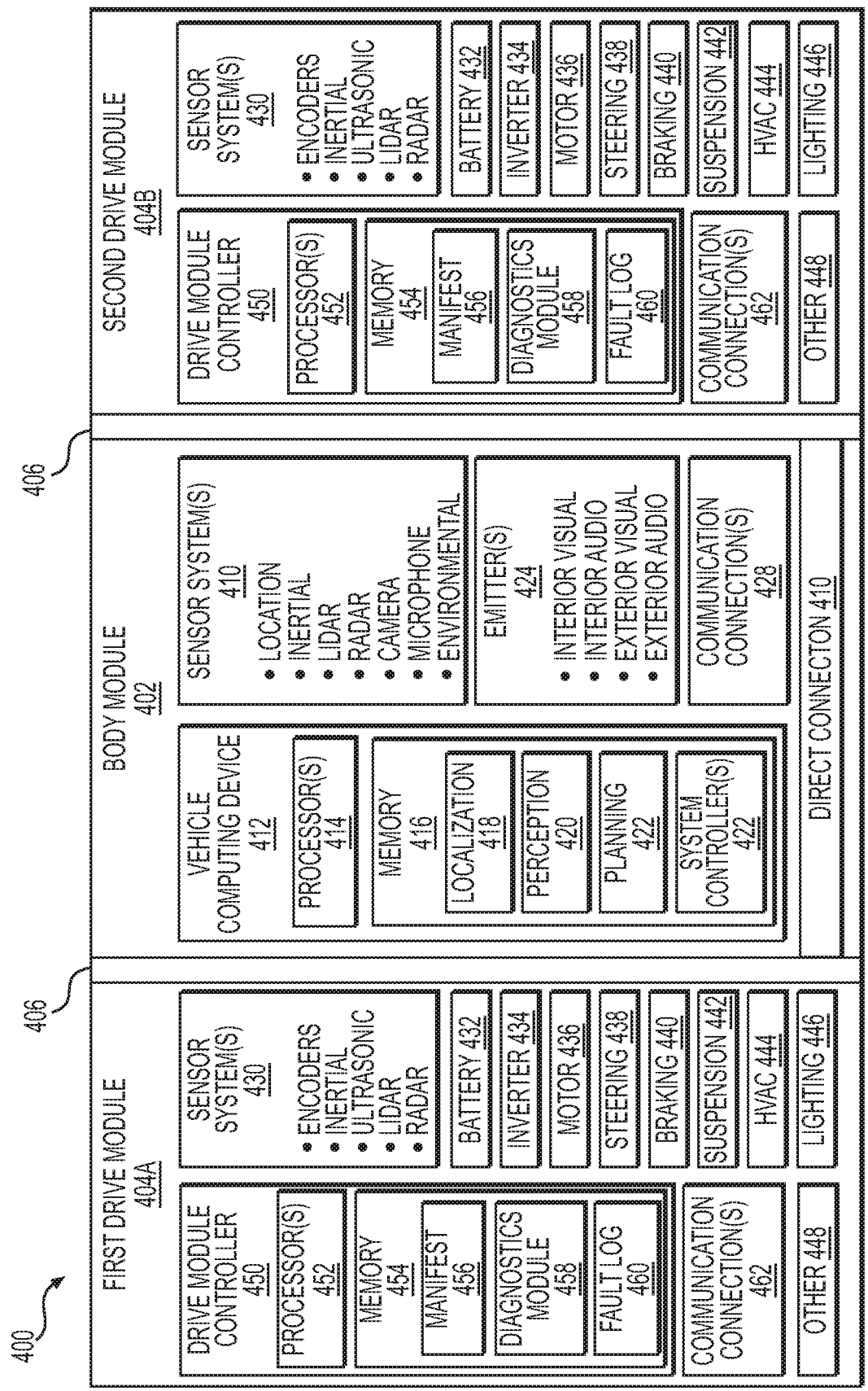
FIG. 4 is a block diagram illustrating an example computing architecture of a vehicle comprising a body module and a pair of drive modules.

FIG. 4 is a block diagram illustrating an example computing architecture of a vehicle 400 comprising a body module 402, a first drive module 404A and a second drive module 404B. The first and second drive modules 404A and 404B are coupled to the body module 402 by connection interfaces 406. The connection interfaces 406 include one or more mechanical connections as well as connections for any vehicle systems found on the drive modules 404A and 404B. In this case, the connection interfaces 406 each include, in addition to the mechanical connection(s), one or more electrical connections, fluid connections, and air connections.

The connection interfaces 406 may provide electrical, fluid, and/or air connections from the drive modules 404A and 404B to systems of the body module 402. For example, at any given time, one or both of the drive modules 404A and 404B may supply low voltage electricity over the electrical connection to power computing systems of the body module 402. Also, data and communications may be transmitted bidirectionally over the electrical connection. Temperature controlled air from HVAC systems of one or both drive modules 404A and 404B may be conveyed to the body module via the air connections.

Additionally, the connection interfaces 406 may provide electrical, fluid, and/or air connections between the drive modules 404A and 404B. This may be accomplished via a bypass or direct connection 408 in the body module 402 that directly connects the drive modules 404A and 404B. For example, a hydraulic braking system of the first drive module 404A may be in direct fluidic communication with a hydraulic braking system of the second drive module 404B via direct connection 408 in order to balance the pressure in the braking systems of both drive modules 404A and 404B. As another example, compressed air from a compressed air system of the first drive module 404A may be directly connected to a compressed air system of the second drive module 404B to balance air pressure of an air suspension system of one or both drive modules 404A and 404B. As yet another example, the direct connection 408 may provide a high voltage link between the batteries of the two drive modules 404A and 404B in order operate the vehicle off the batteries of both drive modules 404A and 404B to maintain voltage equilibrium between the batteries. While not shown, a switch or valve may be disposed in the direct connection 408 in order selectively close one or more of the direct electrical, fluid, and/or air connections between the drive modules 404A and 404B.

The body module 402 includes one or more sensor systems 410. In this example, the sensor system(s) 410 include one or more location sensors (e.g., GPS, compass, etc.), inertial sensors (e.g., inertial measurement units, accelerometers, gyroscopes, etc.), LIDAR sensors, radar sensors, cameras (RGB, IR, intensity, depth, etc), microphones, and/or environmental sensors (e.g., temperature sensors, pressure sensors, humidity sensors, etc.). The sensor system(s) 410 may include multiple instances of each of these or other types of sensors. For instance, the LIDAR sensors may include individual LIDAR sensors located at the corners, front, back, sides, and/or top of the vehicle 400. As another example, the camera sensors may include multiple cameras disposed at various locations about the exterior and/or interior of the vehicle 400. Additionally, in other examples, the body module may include additional or alternative sensors. The sensor system(s) 410 provide input to a vehicle computing device 412 of the body module 402.

The vehicle computing device 412 includes one or more processors 414 and memory 416 communicatively coupled with the one or more processors 414. In the illustrated example, the vehicle 400 is an autonomous vehicle. Thus, the memory 416 of the vehicle computing device 412 stores a localization system 418 to determine where the vehicle 400 is in relation to a local and/or global map, a perception system 420 to perform object detection and/or classification, and a planner system 422 to determine routs and/or trajectories to use to control the vehicle 400. Additional details of localizer systems, perception systems, and planner systems that are usable can be found in U.S. patent application Ser. No. 14/932,963, filed Nov. 4, 2015, entitled "Adaptive Mapping to Navigate Autonomous Vehicle Responsive to Physical Environment Changes," and Ser. No. 15/632,208, filed Jun. 23, 2017, entitled "Trajectory Generation and Execution Architecture," both of which are incorporated herein by reference.

The vehicle 400 also includes one or more emitters 424 for emitting light and/or sound. The emitters 424 in this example include interior audio and visual emitters to communicate with passengers of the vehicle 400. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 424 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles. In this example, lights to illuminate a region generally in front or behind the vehicle (e.g., head/tail lights) are shown as being disposed on the drive modules 404A and 404B. However, in other examples, such lights may additionally or alternatively be included on the body module 402.

The vehicle computing device 412 also includes a variety of other vehicle system controllers 426 configured to control steering, propulsion, braking, safety, emitters, communication, and other systems of the vehicle 400. These system controllers 426 may communicate with and/or control corresponding systems of the drive modules 404A and 404B and/or the body module 402.

The body module 402 also includes one or more communication connection(s) 428 that enable communication by the vehicle 400 with one or more other local or remote computing devices. For instance, the communication connection(s) 428 may facilitate communication with other local computing devices on the body module 402 and/or the drive modules 404A and 404B. Also, the communication connection(s) 428 may allow the vehicle to communicate with other nearby computing devices (e.g., other nearby vehicles, traffic signals, etc.). For instance, the communications connection(s) 428 may enable to the body module 402 to communicate with a nearby drive module during an installation process to control or guide the drive module into engagement with the body module 402, or during a disengagement process to detach and control or guide the detached drive module away from the body module. The communications connection(s) 428 also enable the body module 402 to communicate with a remote teleoperations computing device or other remote services.

The communications connection(s) 428 include physical and/or logical interfaces for connecting the vehicle computing device 412 to another computing device or a network. For example, the communications connection(s) 428 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The drive modules 404A and 404B are shown in this example as being identical. Thus, the components of the drive modules 404A and 404B are discussed together. However, in other examples, the first drive module 404A may be different than the second drive module 404B. For instance, as discussed above, one drive module may have a subset of the features of the other drive module, or the drive modules may have one or more distinct or mutually exclusive vehicle systems. In examples in which the drive modules 404A and 404B are identical, they provide the vehicle with redundancy of systems and components (e.g., sensors, battery, inverter, motor, steering, braking, suspension, HVAC, lighting, drive module controller, communication connections, etc.). Thus, if a system of one drive module or a component thereof fails or needs services, in many instances, the vehicle will be able to continue to operate by relying on the corresponding system or component of the other drive module.

In the illustrated example, the drive modules 404A and 404B include one or more sensor systems 430 to detect conditions of the drive modules and/or the surroundings of the vehicle. By way of example and not limitation, the sensor system(s) 430 may include one or more wheel encoders (e.g., rotary encoders) to sense rotation of the wheels of the drive modules, inertial sensors (e.g., inertial measurement units, accelerometers, gyroscopes, etc.) to measure orientation and acceleration of the drive module, cameras or other image sensors, ultrasonic sensors to acoustically detect objects in the surroundings of the drive module, LIDAR sensors, and/or radar. Some sensors, such as the wheel encoders may be unique to the drive modules 404A and 404B. In some cases, the sensor system(s) 430 on the drive modules may overlap or supplement corresponding systems of the body module 402. For instance, when present, the LIDAR sensors on the drive modules 404A and 404B may be in addition to, and may supplement the fields of view of, the LIDAR sensors on the body module 402. Other sensors such as the inertial sensors of the drive modules 404A and 404B may measure the same or similar forces/conditions as the inertial sensors on the body module 402, but may measure them from the perspective of the drive module. This may, for instance, enable to the drive modules 404A and 404B to operate and "balance" on their own even when detached from the body module 402. In some examples, such sensor systems 430 include, but are not limited to, mass airflow sensors, pressure sensors for tires, battery charge capacity sensors, various microcontrollers capable of outputting diagnostic signals of associated systems or subsystems, and the like.

The drive modules 404A and 404B in this example include many of the vehicle systems, including a high voltage battery 432, an inverter 434 to convert direct current from the battery into alternating current for use by other vehicle systems, an electric drive motor 436 to propel the vehicle, a steering system 438 including an electric steering motor and steering rack, a braking system 440 including hydraulically or electric actuators, a suspension system 442 including hydraulic and/or pneumatic components, an HVAC system 444, lighting 446 (e.g., lighting such as head/tail lights to illuminate an exterior surrounding of the vehicle), and one or more other systems 448 (e.g., cooling system, traction control, safety systems, onboard charging system, other electrical components such as a DC/DC converter, a high voltage junction, a high voltage cable, charging system, charge port, etc.).

The drive modules 404A and 404B also include a drive module controller 450 to receive and preprocess data from the sensor system(s) 430 and to control operation of the various vehicle systems 432-448. The drive module controller 450 includes one or more processors 452 and memory 454 communicatively coupled with the one or more processors 452. The memory 454 of the drive modules 404A and 404B stores a manifest 456 including a list or other data structure maintaining an inventory of the components that are included in the respective drive module. In some examples, such an inventory may include batch numbers for various parts, components, systems, or subsystems. In some examples, the manifest 456 may be generated and/or updated automatically by, for example, communication with the individual components/systems, or by sensing or reading one or more machine readable codes associated with the individual components/systems (e.g., by reading a radio frequency ID tag or barcode applied to each component/system). Additionally or alternatively, some components/systems may be added to the manifest manually by a technician when assembling or servicing the drive module.

A diagnostics module 458 may execute on the drive module controller 450 to check systems of the respective drive module to ensure that they are operating within normal operating parameters. The diagnostics module 458 may employ data collected by sensor system(s) 430 of the drive module and/or data from the sensor system(s) 410 or vehicle computing device 412 of the body module 402. Any failures or anomalies may be recorded in a fault log 460. The fault log 460 may include an indication of the failure or anomalous measurement detected and an identifier off the component(s)/system(s) involved. The fault log 460 may also store a snapshot of operating conditions leading up to the failure or anomalous measurement. The manifest 456 and the fault log 460 may be stored locally at the drive module and used by service technicians to troubleshoot problems when servicing the drive module. Additionally or alternatively, the manifest 456 and/or fault log 460 may be reported to the body module 402, an automated service robot, and/or to a remote service (e.g., a teleoperations computing device, an inventory tracking system, etc.). This reporting may occur periodically (e.g., daily, hourly, etc.) or upon the occurrence of certain events (e.g., detection of a collision, transit to a service location, etc.). In some examples, the manifest 456 and/or fault log 460 (or a subset thereof) may be included in a vehicle heartbeat signal that is periodically transmitted to a remote fleet management system or teleoperations service.

The drive modules 404A and 404B also include one or more communication connection(s) 462 that enable communication by the respective drive module with one or more other local or remote computing devices. For instance, the communication connection(s) 462 may facilitate communication with other local computing devices on the respective drive module and/or the body module 402. Also, the communication connection(s) 462 may allow the drive module to communicate with other nearby computing devices (e.g., detached by proximate body module, an automated services vehicle, a remote control device, etc.). For instance, the communications connection(s) 462 may enable to the drive module to communicate with a nearby body module during an installation process to facilitate engagement with the body module 402, or during a disengagement process to detach and control or guide the drive module away from the body module. The communications connection(s) 462 also enable the drive modules 440A and 404B to communicate with a remote teleoperations computing device or other remote services.

The communications connection(s) 462 include physical and/or logical interfaces for connecting the drive module controller 450 to another computing device or a network. For example, the communications connection(s) 462 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The processor(s) 414 of the body module 402 and the processor(s) 452 of the drive modules 404A and 404B may be any suitable processor capable of executing instructions to process data from the sensor system(s) 410 and 430 and control operation of the vehicle systems. By way of example and not limitation, the processor(s) 414 and 452 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 416 and memory 454 are examples of non-transitory computer-readable media. Memory 416 and memory 454 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

Example Connection Interface

Figure 5:
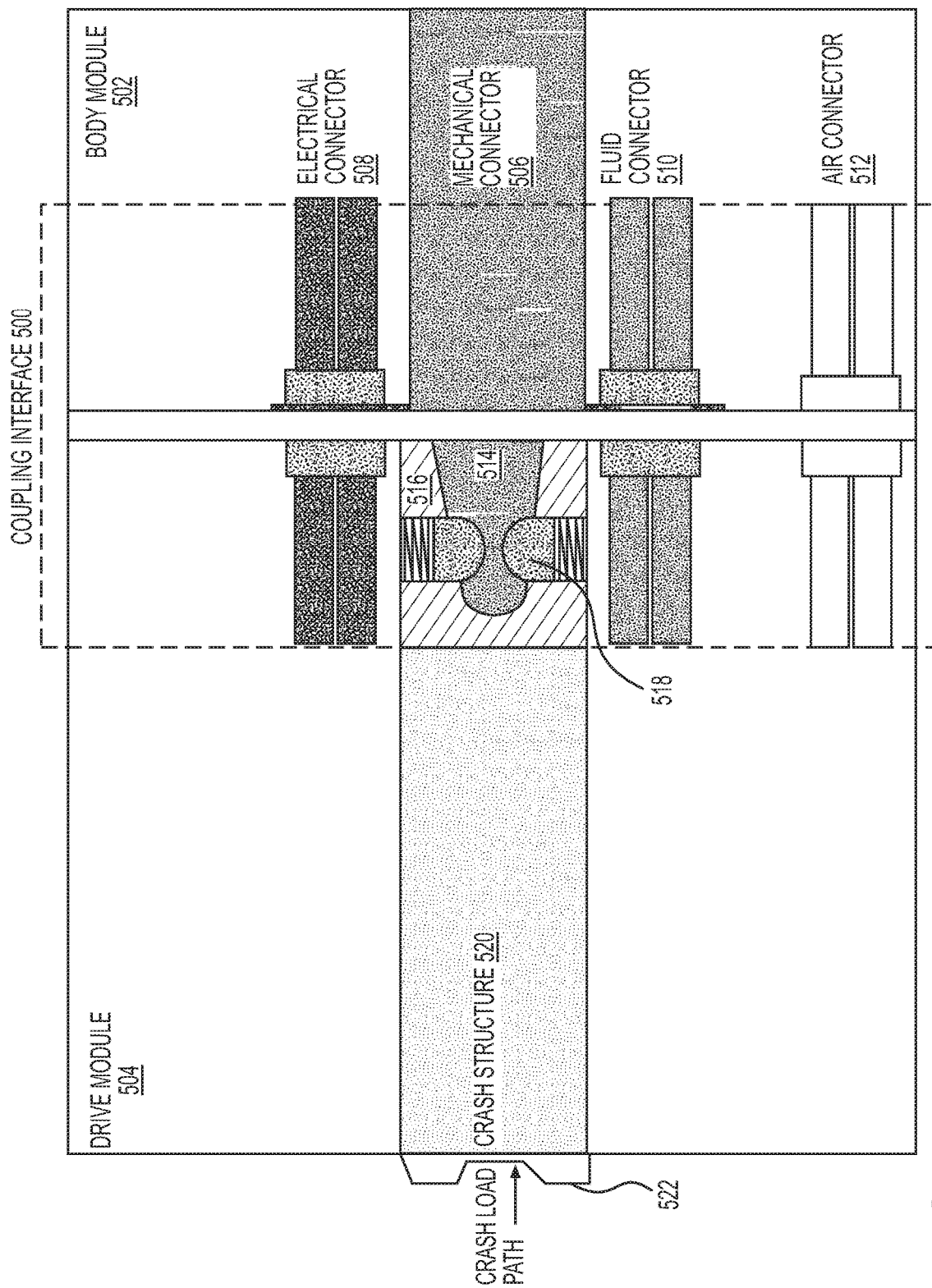
FIG. 5 is a schematic cross section of a vehicle showing an example connection interface coupling a body module to a drive module.

FIG. 5 is a schematic cross section of a vehicle showing an example connection interface 500 coupling a body module 502 to a drive module 504. The connection interface 500 is one example of a connection interface that can be used with vehicles 100, 200, 300, and 400. The connection interface 500 includes components on both the body module 502 and the drive module 504. In that sense, the body module 502 has a connection interface and the drive module 504 has a complimentary connection interface. However, for the purposes of this discussion, unless otherwise indicated, the connection interface 500 refers to the components of both the body module 502 and the drive module 504. The connection interface 500 is one example of a connection interface that can be used with vehicles 100, 200, 300, and 400.

Since FIG. 5 is a cross section, it illustrates a mechanical connector 506 or "coupler," an electrical connector 508, a fluid (e.g., hydraulic, brake, transmission, suspension, coolant, etc.) connector 510, and an air connector 512. However, the connection interface 500 may include multiple of each of these types of connectors. For instance, the connection interface 500 may include any number of one or more mechanical connectors 506 (e.g., 1, 2, 4, 8, or more) as appropriate to secure the drive module 504 to the body module 502. As another example, the connection interface 500 may include multiple electrical connectors 508, including one or more high voltage electrical connectors to connect high voltage from a battery of the drive module 504 with a battery of the other drive module and/or with systems on the body module, and one or more low voltage connectors to provide low voltage to power and/or communicate with systems of the body module. The connection interface 500 may also include multiple fluid connectors (e.g., to equalize pressure in hydraulic/brake lines, for coolant inlets and/or outlets, etc.). The connection interface 500 may also include multiple air connectors (e.g., to provide temperature controlled air from the HVAC system of the drive module 504 to the passenger compartment of the body module 502, to connect compressed air from a compressor of the drive module 504 to operate door locks or other systems of the body module 502 and/or to connect compressed air systems of the two drive modules for use with an air suspension system). In some examples, the electrical connectors 508, fluid connectors 510, and/or air connectors 512 may be blind connectors that automatically contact/connect/seal when the drive module 504 contacts and is mechanically connected to the body module 502.

The illustrated mechanical connector 506 comprises a tapered shaft 514 that protrudes from the body module 502 and is received by a complimentary tapered collet 516 on the drive module 504. The tapered shaft 514 and collet 516 act as guides to align the drive module 504 with the body module 502 during attachment. The collet 516 includes multiple pins 518 or ball bearings that slide over a tip of the shaft 514 and lock into a groove around the shaft 514, securing the collet 516 (and hence the drive module 504) to the shaft 514 (and the body module 502). The pins 518 may be spring loaded such that they snap into engagement in the groove. The pins 518 may be disengaged from the groove by, for example, a manual release lever or automatically by a solenoid or other actuator of the body module 502 or the drive module 504. In other examples, the location of the shaft and the collet may be switched (e.g., the shaft may be located on the drive module and the collet may be located on the body module). Also, in other examples, other types of mechanical connectors may be used (e.g., cam locks, bolts, etc.). In some examples, the connection interface 500 may use multiple different types of mechanical connections.

The mechanical connector(s) 506 connect a crash structure 520 of the drive module 504 to the body module 502. In the event that the vehicle is in a collision, an impact crash load is applied to a bumper 522 of the vehicle. The impact crash load is a force applied generally parallel with a longitudinal axis of the vehicle and is generally aligned with the crash structure 520. If the collision is of sufficient force, the crash structure 520 will crumple, collapse, or otherwise deform to absorb the forces of the impact. In this way, the drive module 504 may minimize impact forces and damage imparted to the body module 502. Because the mechanical connector(s) 506 in this example are aligned with the crash structure 520, the mechanical connector(s) 506 are subjected to minimal shear forces (e.g. forces perpendicular to the longitudinal direction) due to the collision, thus minimizing the chances that the drive module 504 will become disconnected from the body module 502 during a collision.

In the illustrated example, all of the connectors extend parallel to one another from common surfaces of the body module and drive module, respectively. However, in other examples, the connectors may extend in different directions from, or be disposed on different surfaces of, the body module or the drive module, respectively. The illustrated connection interface 500 is shown mating a drive module with a body module horizontally (i.e., in the X-direction). However, the same or similar connection interface may also be used to mate a drive module with a body module vertically (i.e., in the Z-direction).

Example Drive Module

Figure 6:
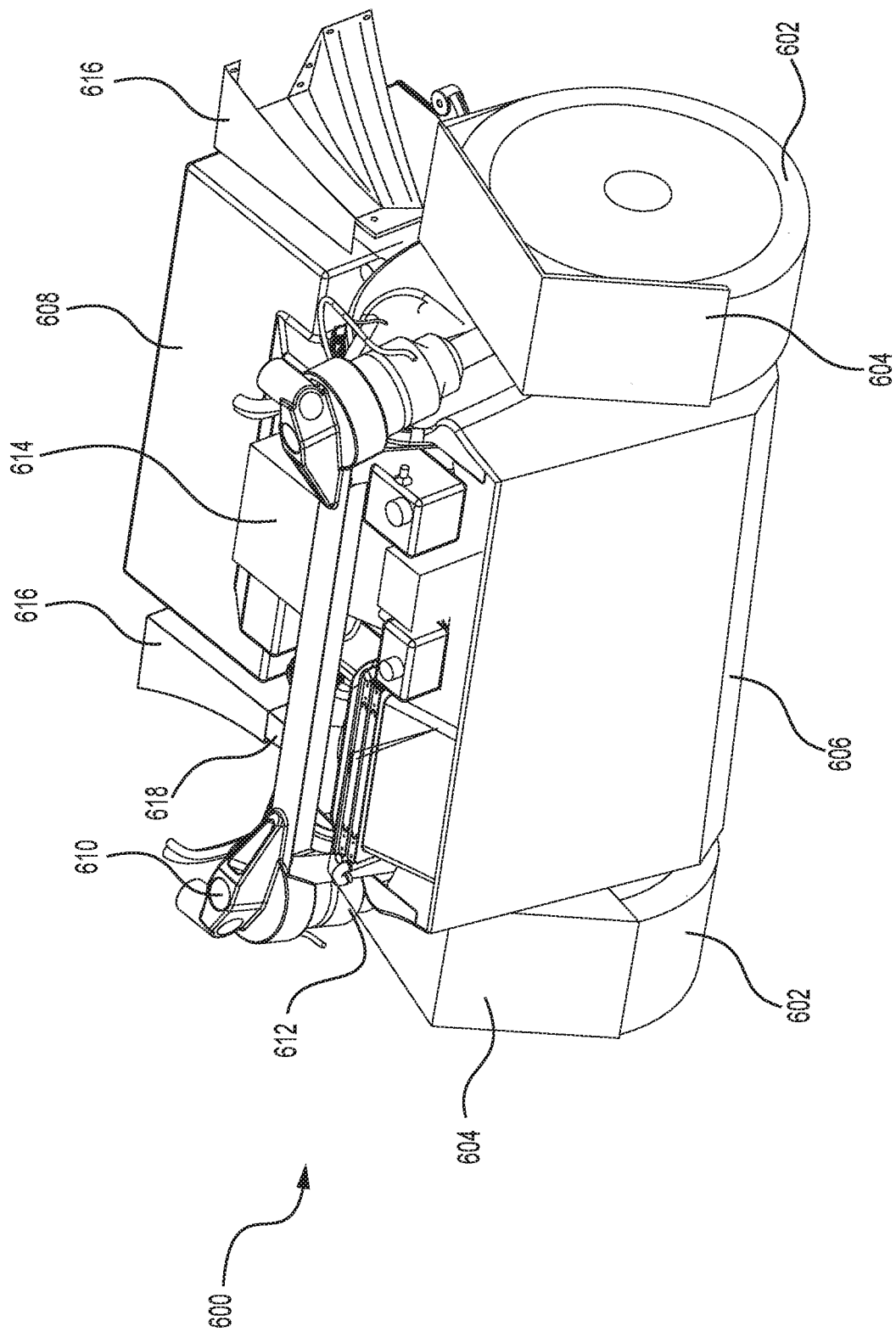
FIG. 6 is a perspective view of an example drive module that may be coupled to a body module of a vehicle.

FIG. 6 is a perspective view of an example drive module 600. The drive module 600 is an example of the drive modules, or may be used instead of the drive modules, shown with the vehicles in FIGS. 1-5, for example. However, the drive module 600 is not limited to use in such vehicles.

The drive module 600 in this example includes wheels 602, body panels (e.g., fenders 604 and front fascia 606), a high voltage battery 608, a suspension system (including shock towers 610 and shocks/dampers 612), and an HVAC system 614. A propulsion system, steering system, braking system, cooling system and other components are also included in the drive module 600, but are not visible in this figure. Also shown in this figure are brackets 616 which connect crash structure 618 of the drive module 600 with a body module. As shown, a first end of the brackets 616 is coupled to the crash structure 618 and a second end of the brackets 616 (distal from the drive module) is configured to couple to the body module. The second end of the brackets has a larger surface area than a surface area of the first end of the brackets. This helps to distribute impact forces transferred by the crash structure 618 to the larger area of the body module and, consequently, helps to isolate damage caused by a collision to the drive module.

In some examples, the drive module 600 may arrive at the final assembly plant fully assembled, generally as shown in FIG. 6, and ready to be mated with a body module. In that case, the wheels 602 may be aligned at the factory, the battery 608 may be charged, fluid reservoirs may be filled, joints may be greased, etc.

Figure 7:
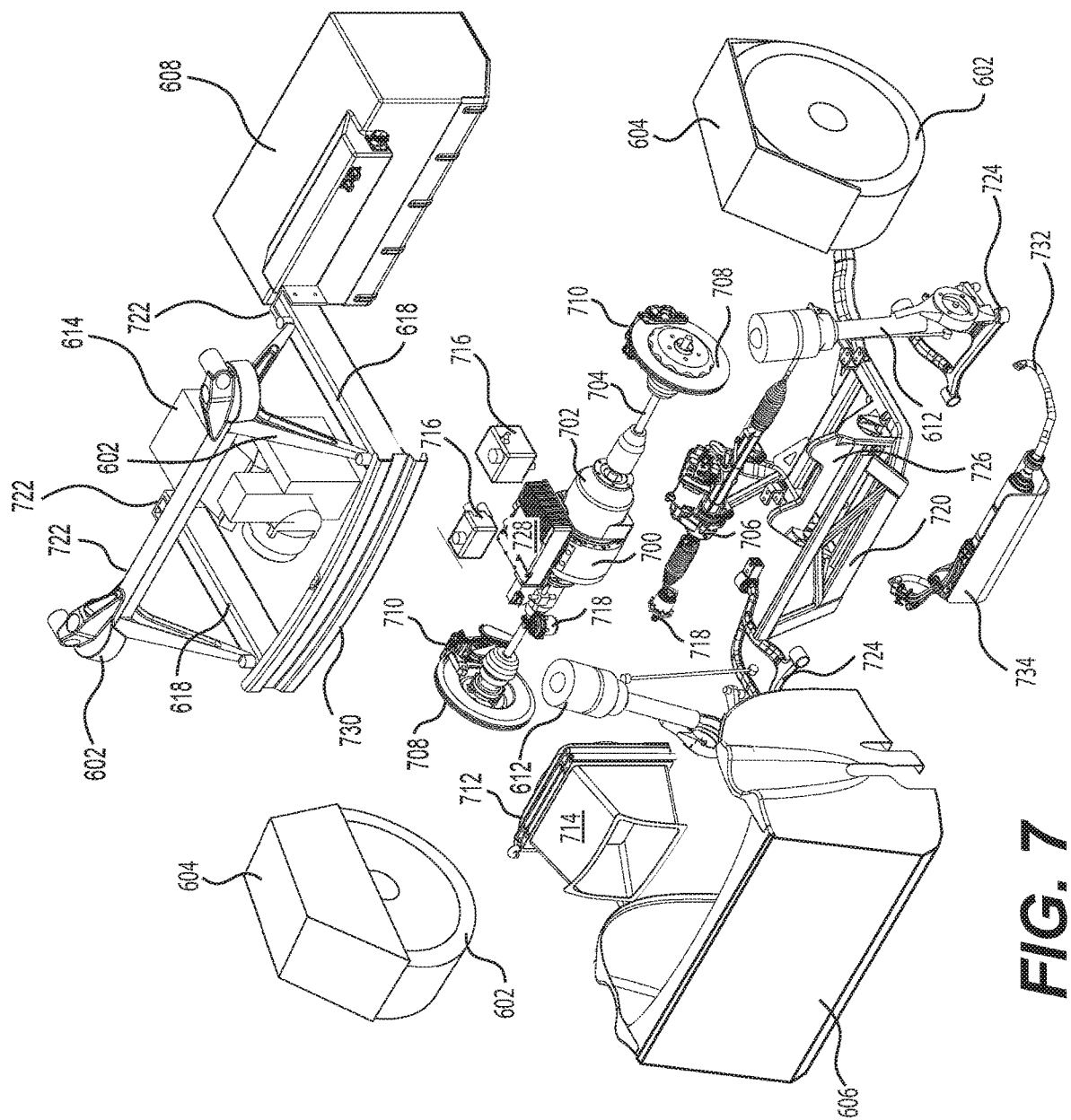
FIG. 7 is an exploded view of the example drive module of FIG. 6.

FIG. 7 is an exploded view of the drive module 600 showing internal components of the drive module 600. In addition to the components described with reference to FIG. 6, the drive module 600 also includes a propulsion system (including a drive motor 700, gear box 702, and axles 704), a steering system (including a steering rack 706), a braking system (including disks 708 and calipers 710), and a cooling system (including a radiator 712, radiator ducting 714, one or more coolant reservoirs 716, and one or more coolant pumps 718). The battery 608, propulsion system, steering system, suspension system, body panels, and other components are coupled to a drive module frame (including a lower sub-frame 720 and an upper sub-frame 722).

The suspension system further includes control arms 724 coupled to the lower sub-frame 720. A motor mount 726 couples the drive motor 700 and gear box 702 to the lower sub-frame 720. An inverter 728 is disposed above the drive motor 700.

A bumper 730 is coupled to the crash structure 618 and the upper sub-frame 722. An anti-sway bar 732 is coupled to suspension/steering systems to reduce body roll. A skid plate 734 is disposed under the lower sub-frame to protect an underside of the drive module 600. In FIG. 7, all wiring harnesses, coolant lines, and brake lines have been omitted for clarity. One of ordinary skill in the art would readily understand where and how to connect the omitted harnesses and lines.

Example Methods

Figure 8:
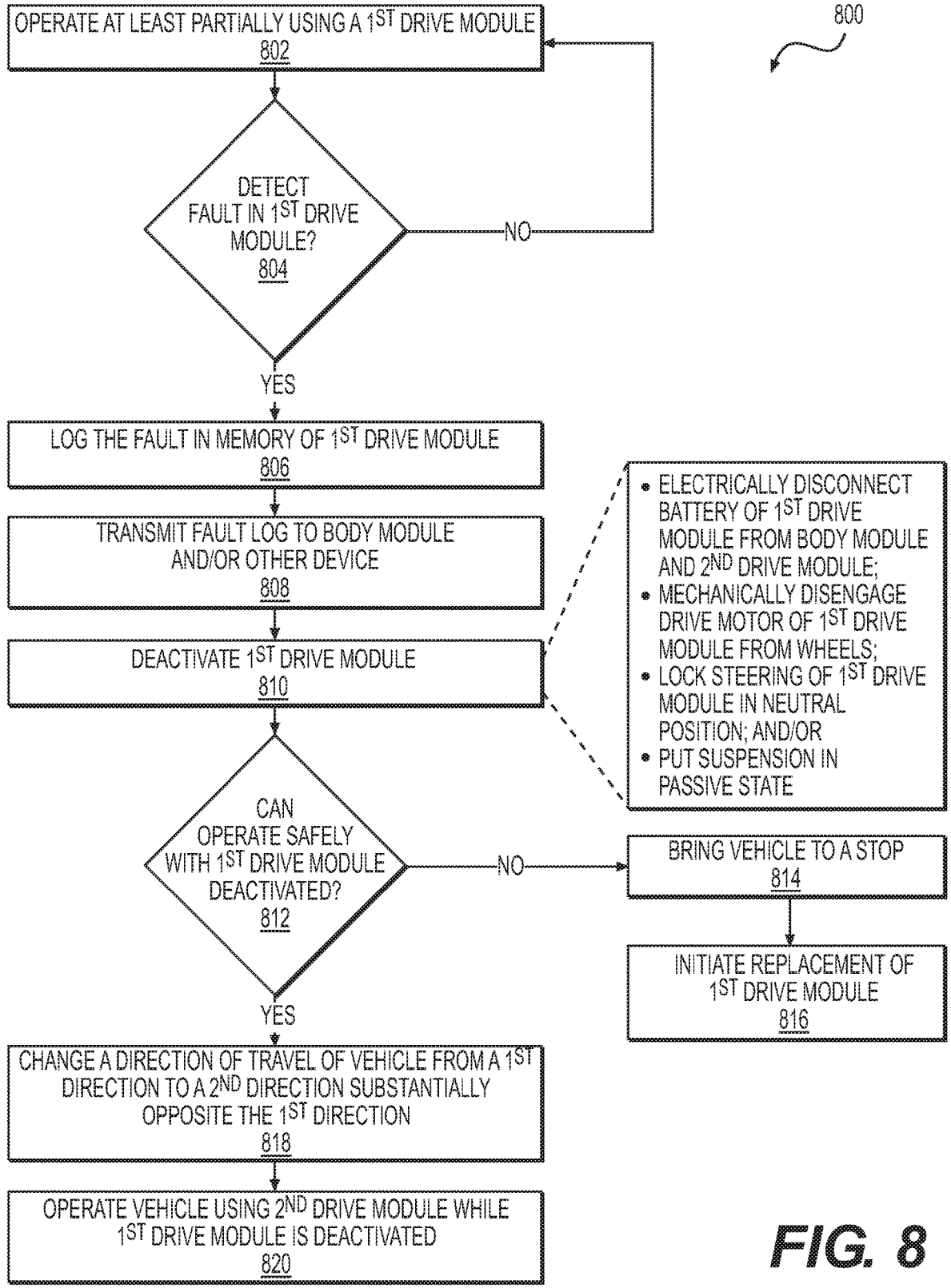
FIG. 8 is a flowchart illustrating an example method operating a vehicle responsive to a fault in a component of the vehicle.
Figure 9:
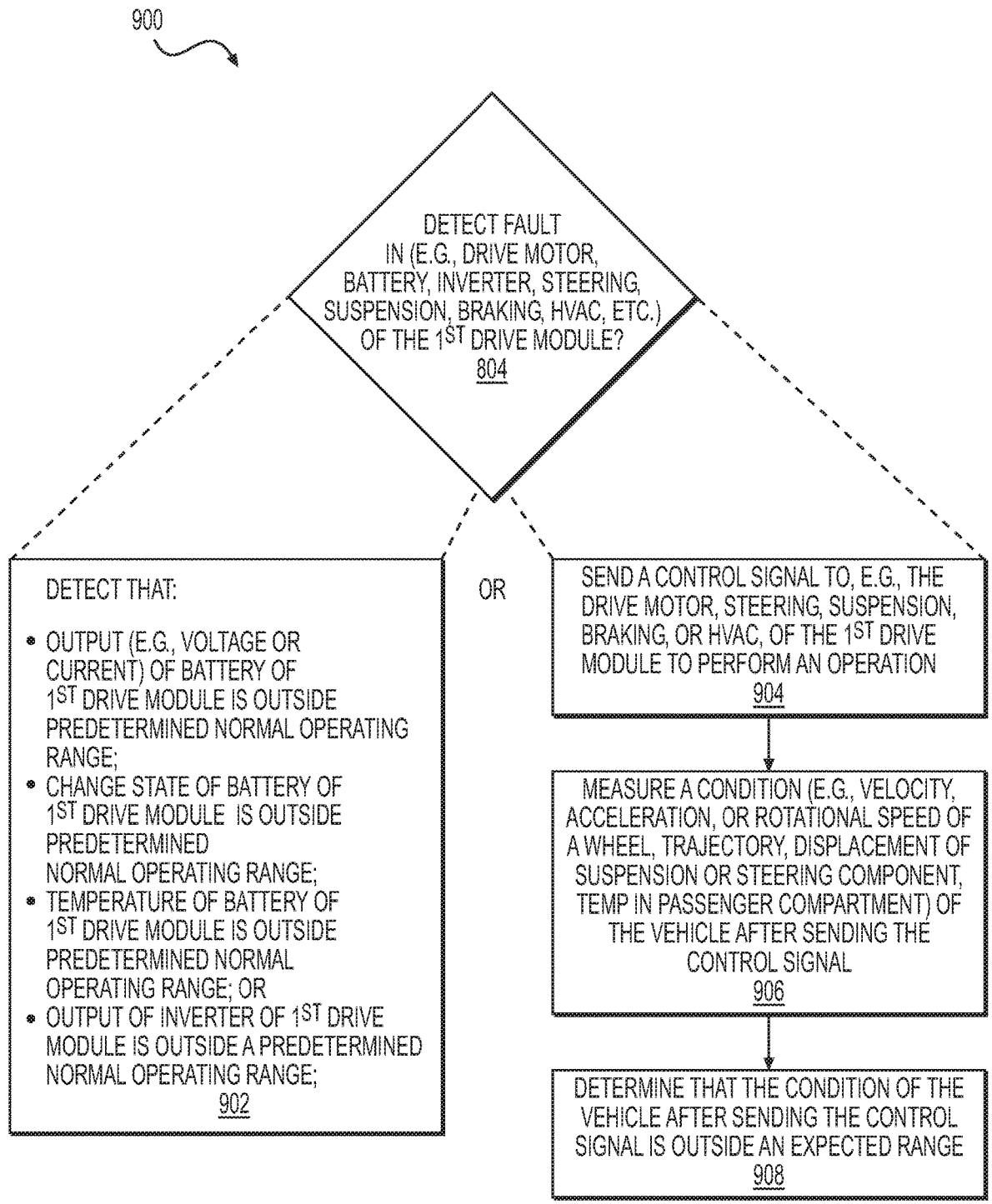
FIG. 9 is a flowchart illustrating example details of detecting a fault in a component of the vehicle.
Figure 10:
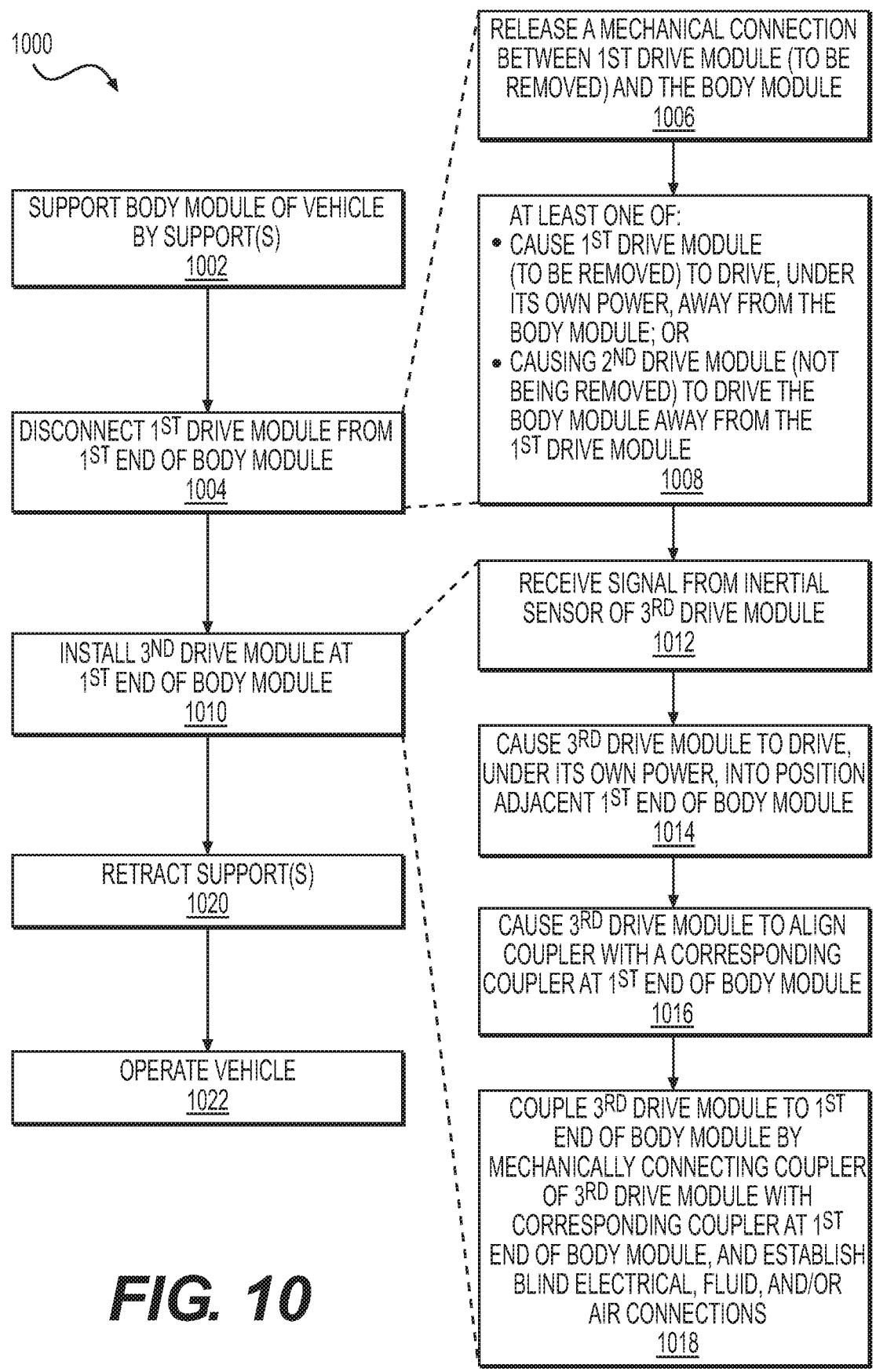
FIG. 10 is a flowchart illustrating an example an example method of installing and/or replacing a drive module of a vehicle.

FIGS. 8-10 are flowcharts showing example methods involving vehicles having drive modules that are detachable from a body module. The methods illustrated in FIGS. 8-10 are described with reference to one or more of the vehicles, body modules, and/or drive modules shown in FIGS. 1-7 for convenience and ease of understanding. However, the methods illustrated in FIGS. 8-10 are not limited to being performed using the vehicles, body modules, and/or drive modules shown in FIGS. 1-7, and may be implemented using any of the other vehicles, body modules, and/or drive modules described in this application, as well vehicles, body modules, and/or drive modules other than those described herein. Moreover, the vehicles, body modules, and/or drive modules described herein are not limited to performing the methods illustrated in FIGS. 8-10.

FIG. 8 illustrates an example method 800 of operating a vehicle, such as vehicle 100, 200, 300, or 400, responsive to a fault in a component of the vehicle. The vehicle in this example includes a body module, a first drive module that is removably coupled to a first end of the body module, and a second drive module that is removably coupled to a second end of the body module. In some examples, the body module may include a passenger compartment, while in others it may not.

The method 800 includes operation 802, during which the vehicle operates at least partially using the first drive module. In some examples, during operation 802 the vehicle may be using both the first and second drive modules. In other examples, during operation 802 the vehicle may be using just the first drive module and the second drive module may be at least partially deactivated.

During operation, the vehicle may monitor systems of the vehicle to make sure they are functioning properly. This monitoring may be performed by one or both of the drive modules (e.g., by diagnostics module 458), by a program running on a computing device of the body module (e.g., by a system controller 426 of the vehicle computing device 412), or both. At operation 804, the vehicle determines whether a fault has occurred in the first drive module. A fault may correspond to a failure of a component of the drive module, an anomalous output of the component, or a condition detected by one or more sensor systems of the vehicle (e.g., sensor systems 410 of the body module and/or sensor systems 430 of one of the drive modules). Additional details of detecting a fault are described with reference to FIG. 9. If, at operation 804, no fault is detected in the first drive module, the method returns to operation 802 and continues to operate at least partially using the first drive module. If, however, a fault is detected in the first drive module, the method 800 proceeds, at operation 806, to log the fault in memory of the first drive module for further diagnosis and trouble shooting. In some examples, the vehicle may, at operation 808, transmit the fault log to the body module and/or one or more other devices (e.g., a teleoperations computing device, an automated services robot, a computing device of a technician, etc.). Transmission of the fault log, at operation 808, may be performed immediately after logging the fault, or at a later time such as at a prescheduled diagnostic report time, upon the occurrence of an event (e.g., upon traveling within a proximity of a service location, upon determining that the fault prevents the vehicle from operating safely, etc.).

At operation 810, the vehicle may deactivate the first drive module. Depending on the nature of the fault detected, deactivating the first drive module may be completely or partially deactivated (e.g., individual components or systems impacted by the fault may be deactivated). For instance, deactivating the first drive module at operation 810 may include any or all of electrically disconnecting a battery of the first drive module from the body module and the second drive module, mechanically disengage the drive motor of the first drive module from the wheels of the first drive module so that the wheels can spin freely, locking the steering of the first drive module in a neutral position so that the first drive module does not turn the vehicle, and/or putting the suspension of the first drive module in passive state. In further examples, a system or component of a drive module having a short circuit or blown fuse may simply be turned off, and/or an HVAC system of a drive module may be electrically and/or fluidically disconnected, while remaining operational systems of drive module may remain active. In some examples, the battery or other energy storage system of one drive module may be sufficient to power electrical systems of the body module (including the vehicle computing device), the other drive module, or both the body module and the other drive module. Thus, if the energy storage system of one drive module fails or becomes discharged, the energy storage system of the other drive module can power the vehicle to allow it to continue operating.

At operation 812, the vehicle determines whether or not the vehicle can continue to operate safely with the first drive module deactivated. For instance, the vehicle may determine whether or not it is able to safely complete a current trip with the first drive module deactivated. Whether or not the vehicle can operate safely with the first drive module deactivated may depend on, for example, the nature of the fault, the condition of the other drive module, a duration of the current trip, a distance from a service location, and/or other factors. For instance, if the fault relates to failed equipment (e.g., a flat tire, bad wheel bearing, broken sensor, etc.) or an unsafe condition (e.g., battery substantially over temperature), the vehicle may determine at operation 812 that it cannot safely continue to operate. In that case, the method 800 proceeds, at operation 814, to bring the vehicle to a safe stop and, at operation 816, to initiate replacement of the first drive module. Initiating replacement of the first drive module at operation 816 may begin by sending a message to a teleoperations computing device, a repair service, an automated service robot, or other entity. Details of an example method of replacing a drive module are provided below with reference to FIG. 10.

If, at operation 812, the vehicle determines that it is safe to continue operating with the first drive module deactivated, the method 800 continues to operation 818 if the vehicle is a bidirectional vehicle, else to operation 820. If the vehicle is a bidirectional vehicle, responsive to deactivating the first drive module and changing to operate using the second drive module, at operation 818 the vehicle may, but need not necessarily, change a direction of travel. For instance, if the vehicle were traveling in a first direction under power of the first drive module prior to detection of the fault, after detecting the fault and deactivating the first drive module, the vehicle may commence traveling in a second direction, substantially opposite the first direction. Thus, what was a trailing end of the vehicle prior to the fault becomes the leading end of the vehicle after the fault.

At operation 820, after deactivating the first drive module (and optionally changing a direction of travel in the case of a bidirectional vehicle), the vehicle proceeds to operate the vehicle using the second drive module, while the first drive module remains deactivated. Operation 820 may continue indefinitely, until the vehicle completes its current route (i.e., to its next destination), until a next regularly scheduled service appointment, or until an automated services robot is available (or within a predetermined distance of the vehicle), for example.

FIG. 9 illustrates a method 900 including additional details of detecting a fault at operation 804. As shown in FIG. 9, operation 804 may include detecting a fault in, for example, a drive motor of the first drive module, a battery of the first drive module, an inverter of the first drive module, a steering system of the first drive module, a suspension system of the first drive module, a braking system of the first drive module, and/or a heating ventilation and air conditioning (HVAC) system of the first drive module.

In some examples, at operation 902, a fault may be detected responsive to detecting that an output (e.g., voltage or current) of a battery of the first drive module is outside a predetermined normal operating range, a charge state of a battery of the first drive module is outside a predetermined normal operating range, a temperature of a battery of the first drive module is outside a predetermined normal operating range, an output of an inverter of the first drive module is outside a predetermined normal operating range, and/or a condition of a charge circuit is outside a predetermined normal operating range.

Alternatively, a fault may be detected by detecting sensor outputs responsive to control signals. For instance, the vehicle may command the vehicle to move according to a trajectory and speed, the vehicle controller converts trajectory and speed to instructions for inverter (torque request for motors). The vehicle can then compare sensor data from one or more sensors of the drive module (e.g., wheel encoders, current sensors, etc.), body module (e.g., detected motion of vehicle doesn't match trajectory), or both, to see if the actual condition of the vehicle (motion, temp, etc.) matches what is expected based on the command. This approach may be performed by, at operation 904, sending a control signal to the first drive module to perform an operation, at operation 906, measuring a condition of the vehicle after sending the control signal, and, at operation 908, determining that the condition of the vehicle after sending the control signal is outside an expected range. For example, detecting a fault may include sending a control signal to control a drive motor of the first drive module, and measuring at least one of a velocity, acceleration, or rotational speed of a wheel of the vehicle. In another example, detecting a fault may include sending a control signal to control a steering system of the first drive module, and the measuring a trajectory of the vehicle. In another example, detecting a fault may include sending a control signal to control a suspension system of the first drive module, and measuring a position or displacement of a structural element of the suspension system of the vehicle. In another example, detecting a fault may include sending a control signal to control a braking system of the first drive module, and measuring at least one of a velocity, acceleration, or rotational speed of a wheel of the vehicle. In yet another example, detecting a fault may include sending a control signal to control a heating ventilation and air conditioning (HVAC) system of the first drive module, and measuring a temperature in the passenger compartment of the vehicle.

Though not illustrated in FIG. 9, determination of a "fault" may more generally be associated with a known condition of one or more components, systems, or subsystems of the vehicle. As a non-limiting example, calipers installed in a drive module may be subject to a recall as being defective. In such an example, the information regarding the batch number for the strut listed in the manifest, and sent in a heartbeat signal, may be associated with a bad batch and indicative of a "fault."

FIG. 10 is a flowchart illustrating an example an example method 1000 of installing and/or replacing a drive module of a vehicle, such as vehicle 100, 200, 300, or 400. In some examples, the method 1000 may be performed in response to initiating replacement of the first drive module at operation 816. In some examples, the method 1000 may be performed in order to replace a drive with a low or depleted battery with a drive module having a fully or at least partially charged battery.

The method 1000 includes, at operation 1002, supporting a body module of the vehicle above a driving surface (e.g., road, parking lot, floor, etc.) by one or more supports. As discussed above, in some examples, the supports may comprise jacks that are built into an underside of the body module and have substantially flat bottom surfaces, casters, or other wheels to allow the body module to be moved or repositioned during installation or removal of the drive modules. In other examples, the supports may comprise jacks or lifts built into a floor of an assembly plant. In still other examples, the supports may comprise jacks or lifts of an automated services robot or operated by a service technician. Supporting the body module at operation 1002 may comprise supporting the body module substantially at its right height (i.e., not elevated), while in other examples the body module may be supported at an elevated level (i.e., above its normal ride height).

At operation 1004, a first drive module may be disconnected from a first end of the body module. In some examples, disconnecting the first drive module may include, at operation 1006, releasing a mechanical connection between the first drive module and the body module and, at operation 1008, separating the first drive module from the body module. Operation 1008 may include causing the first drive module to drive, under its own power, away from the first end of the body module, and/or causing the second drive module to drive the body module away from the first drive module. Operations 1004-1008 may be performed under control of, for example, a controller of the drive module being removed (e.g., drive module 450), a vehicle controller of the body module (e.g., vehicle computing device 412), or under control of an external device (e.g., external device 108). Such control may comprise an inertial stabilization algorithm such that the drive module may maintain a substantially similar orientation throughout the procedure.

At operation 1010, a new (third) drive module may be installed at the first end of the body module. The operation 1010 of installing a new drive module may, in some examples, be performed by causing the drive modules to drive into engagement with the body module. This may be controlled by the drive modules themselves. For instance, when activated or instructed to do so, the drive module that is being installed may autonomously control itself to mate with the body module. The drive module may employ sensor data (e.g., inertial sensor data, ultrasonic sensor data, wheel encoder data, or other sensors systems such as sensor systems 430) in order to locate, align with, and couple to a connection interface of the body module. In some examples, operation 1010 may include, at 1012, receiving a signal from an inertial sensor of the third drive module and, at operation 1014, causing the third drive module to drive, under its own power, into position adjacent to the first end of the body module. At operation 1016, the third drive module may be caused to drive, under its own power, to align a coupler of the third drive module with a corresponding coupler at the first end of the body module based at least in part on the signal from the inertial sensor of the third drive module. This alignment may include using input from the inertial sensors to balance the third drive module with its connection interface aligned with corresponding connection interface of the body module. In other examples, the positioning and/or alignment may be performed under control of, or responsive to, a command or control from the body module or an external device, such one of external devices 108 (e.g., a technician, automated services robot, teleoperation computing device, etc.). In some examples, alignment may include use of visual cues (e.g. barcodes or QR codes), wireless signals, emitter/detector pairs, or the like as coordinated between the body module and drive module.

Once aligned, at operation 1018, the third drive module may be coupled to the first end of the body module. In some examples, coupling the third drive module to the first end of the body module at operation 1018 may be performed automatically when the third drive module is brought within a predetermined proximity to the body module (within 10 centimeters, 5 centimeters, 1 centimeter, etc.). In some examples, operation 1018 may include mechanically connecting the coupler of the third drive module with the corresponding coupler at the first end of the body module. The mechanical connection may be accomplished using one or more bolts, shaft/collet connections like that shown in FIG. 5, cam locks, and/or other fasteners. In some examples, the coupling interface may include one or more blind connections for electricity, fluid, and/or air between the drive module and the body module. In that case, mechanically connecting the coupler of the third drive module with the corresponding coupler at the first end of the body module automatically establishes one or more blind electrical connections between the third drive module and the body module, one or more blind fluid connections between the third drive module and the body module, and/or one or more blind air connection between the third drive module and the body module. Additional details of the number and types of the blind connections are described with reference to FIG. 5. Also, in other examples, the electrical, fluid, and air connections need not be blind connections.

Once the new drive module is coupled to the body module, at operation 1020, the supports may be retracted (automatically or manually), and at operation 1022 the vehicle may be operated (e.g., to drive to a destination).

FIG. 10 illustrates an example in which first and second drive modules have previously been installed to the body module, and the first drive module is removed and replaced with a third drive module. However, the same or similar method may additionally or alternatively be used during an initial assembly process of installing drive modules to the body module (e.g., at an assembly plant). In that case, operation 1004 (disconnecting an existing drive module) can be omitted and operation 1010 (installing a new drive module) can be performed twice, once to install a new drive module at each end of the body module.

Figure 11:
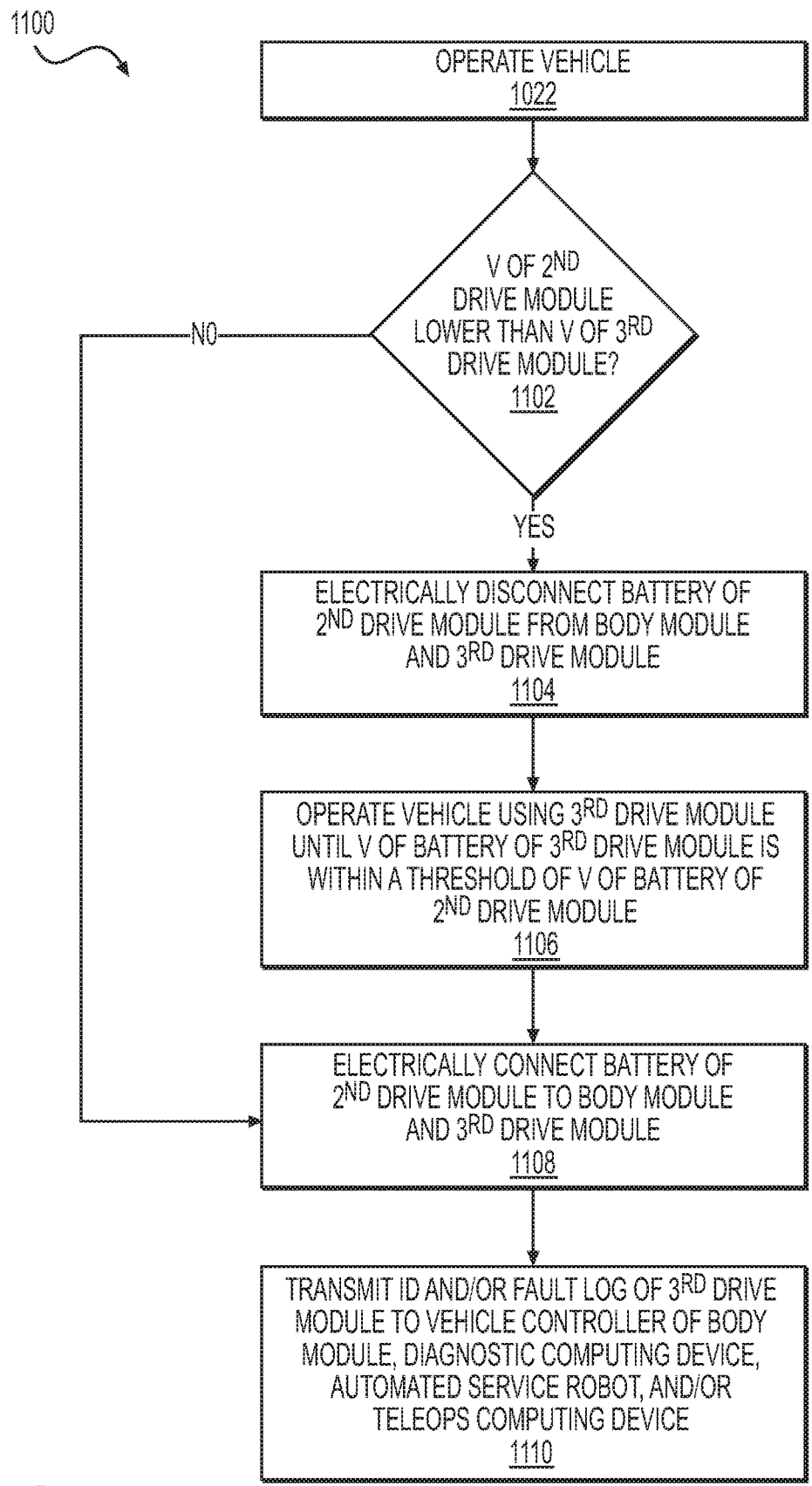
FIG. 11 is a flowchart illustrating an example method of operating a vehicle following replacement/installation of a drive module.

FIG. 11 is a flowchart illustrating an example method 1100 of operating a vehicle following installation or replacement of a drive module. The method 1100 may, in some examples, be implemented following installation or replacement of a drive module according to the method 1000 of FIG. 10. For instance, following commencement of operation of the vehicle at operation 1022 in FIG. 10, the vehicle may check the relative charge states of the drive modules (first and second drive modules in the case of a new installation, or second and third drive modules in the case of a replacement). For ease of discussion, the remainder of the description of FIG. 11 is in the context of a vehicle that has just had the first drive module replaced by a new (third) drive module.

At operation 1102, the vehicle (e.g., by vehicle computing device 412) may determine whether a voltage of one drive module is different (e.g., exceeding a threshold voltage difference) than the other drive module. If, at operation 1102, the vehicle detects that a voltage of the second drive module is sufficiently lower (more than the threshold voltage difference) than the voltage of the third drive module then, at operation 1104, the vehicle may electrically disconnect the battery of the second drive module from the body module and/or the third drive module. This may be accomplished by, for example, disconnecting an electrical direct connection between the drive modules (e.g., direct connection 410). The vehicle may then, at operation 1106, operate the vehicle using the third drive module until the voltage of the battery of the third drive module is within the predetermined threshold of the voltage of the battery of the second drive module. Disconnecting the battery of the second drive module until this voltage equilibrium is reached avoids current spikes when the new drive module is attached, and simplifies the battery management electronics of the system. Once the voltage of the third drive module being within the predetermined threshold of the voltage of the battery of the second drive module, at operation 1108, the vehicle may electrically connect/reconnect the battery of the second drive module to the body module and the third drive module. The vehicle may then operate using the batteries of both drive modules, such that both batteries are charged and depleted in substantially equal amounts.

If, at operation 1102, the vehicle determines that batteries of the drive modules are substantially the same (i.e., a difference in voltage between the batteries is less than the threshold), then the vehicle may proceed to operation 1108 to electrically connect the battery of the second drive module to the body module and the third drive module.

In some examples, upon connection of a new drive module (e.g., the third drive module) to the body module of the vehicle, the new drive module may, at operation 1110, transmit (e.g., by communication connections 462), an identifier of the new drive module and/or a fault log of the drive module to a vehicle controller of the body module, an external diagnostic computing device, an automated services robot, and/or a teleoperation computing device. In this way, the vehicle maintains a record of the drive modules that are attached to it and/or an inventory tracking system of a fleet of vehicles can be updated to reflect which drive modules are installed on which vehicles.

The methods 800, 900, 1000, and 1100 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 800, 900, 1000, and 1100 may be combined in whole or in part with each other or with other methods.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A vehicle comprising: a body module having a first end and a second end, the body module comprising: a passenger compartment to house one or more passengers; and a vehicle computing device to control operation of the vehicle; a drive module removably coupled to the body module at the first end of the body module, wherein the drive module comprises: a drive module frame; first and second wheels; a propulsion system coupled to the drive module frame and to the first and second wheels to drive at least one of the first and second wheels; and a heating ventilation and air conditioning (HVAC) system disposed in or on the drive module frame to provide temperature controlled air to the passenger compartment.

B. The vehicle as paragraph A recites, wherein the drive module further comprises: an energy storage system coupled to the propulsion system and the HVAC system to provide power to the propulsion system and the HVAC system; and a drive module control system communicatively coupled to the vehicle computing device, the drive module control system being configured to control operation of the propulsion system and the HVAC system based at least in part on signals received from the vehicle computing device.

C. The vehicle as paragraph A or B recites, wherein the drive module further comprises: a crash structure coupled to the drive module frame, the crash structure configured to absorb an impact force imparted to the first end of the vehicle.

D. The vehicle as any one of paragraphs A-C recites, wherein the drive module further comprises at least one of: a steering assembly coupled to the first and second wheels to steer the first and second wheels; a braking assembly coupled to the first and second wheels to brake the first and second wheels; a suspension assembly to movably couple the first and second wheels to the drive module frame; one or more exterior body panels or fascia of the vehicle; or one or more exterior lights of the vehicle.

E. The vehicle as any one of paragraphs A-D recites, wherein the drive module is a first drive module, the vehicle further comprising a second drive module removably coupled to the second end of the vehicle, wherein the first drive module and the second drive module are substantially identical.

F. The vehicle as any one of paragraphs A-E recites, wherein: the first drive module further comprises one or more sensors to sense objects in an environment surrounding the first end of the vehicle; and the second drive module further comprises one or more sensors to sense objects in an environment surrounding the second end of the vehicle, wherein the one or more sensors of the first drive module and the one or more sensors of the second drive module are communicatively coupled with the vehicle computing device of the body module.

G. The vehicle as any one of paragraphs A-F recites, wherein the body module comprises: a first connection interface for coupling the first drive module to the first end of the body module; and a second connection interface for coupling the second drive module to the second end of the body module, wherein at least one of the first connection interface or the second connection interface comprises: a mechanical connector to mechanically connect the body module to a respective one of the first drive module or the second drive module; and at least one of: an electrical connector to electrically connect the body module to the respective one of the first drive module or the second drive module; a fluid connector to fluidically connect the body module to the respective one of the first drive module or the second drive module; or an air connector through which to receive temperature controlled air from the HVAC system of the respective one of the first drive module or the second drive module.

H. The vehicle as any one of paragraphs A-G recites, wherein: the mechanical connector comprises an alignment guide to align the body module relative to the respective one of the first drive module or the second drive module; and the at least one of the electrical connector, the fluid connector, or the air connector are blind mating connectors.

I. The vehicle as any one of paragraphs A-H recites, wherein the vehicle comprises an autonomous vehicle and the vehicle computing device of the body module is configured to autonomously control operation of the vehicle.

J. The vehicle as any one of paragraphs A-I recites, wherein the body module further comprises one or more sensors disposed on an exterior of the passenger compartment and in communication with the vehicle computing device of the body module, the one or more sensors to sense objects in an environment surrounding the vehicle.

K. The vehicle as any one of paragraphs A-J recites, wherein: the drive module comprises a light source for emitting light into a path of the vehicle; and the body module further comprises an exterior light source for emitting light into a surrounding of the vehicle.

L. A drive module for a vehicle, the drive module comprising: a drive module frame; first and second wheels; a propulsion system coupled to the drive module frame and to the first and second wheels to drive at least one of the first and second wheels; and a heating ventilation and air conditioning (HVAC) system disposed in or on the drive module frame to, when coupled to the vehicle, provide temperature controlled air to a passenger compartment of the vehicle.

M. The drive module as paragraph L recites, further comprising: an energy storage system coupled to the propulsion system and the HVAC system to provide power to the electric drive motor and the HVAC system; and a drive module control system configured to control operation of the propulsion system and the HVAC system.

N. The drive module as any one of paragraphs L or M recites, further comprising: a crash structure coupled to the drive module frame, the crash structure configured to absorb an impact force imparted to the drive module.

O. The drive module as any one of paragraphs L-N recites, further comprising at least one of: a steering assembly coupled to the first and second wheels to steer the first and second wheels; a braking assembly coupled to the first and second wheels to brake the first and second wheels; a suspension assembly to movably couple the first and second wheels to the drive module frame; one or more exterior body panels or fascia of the vehicle; one or more exterior lights of the vehicle; or one or more sensors coupled to the drive module to sense objects in an environment surrounding the drive module, the sensors comprising one or more of a LIDAR, a radar, or a camera.

P. The drive module as any one of paragraphs L-O recites, wherein the drive module comprises a connection interface for coupling the drive module to a body module of a vehicle, the connection interface comprising: at least one of a guide protrusion or a receptacle to receive a guide protrusion; a mechanical connector to mechanically connect the drive module to the body module of the vehicle; and at least one of: an electrical connector to electrically connect the drive module to the body module of the vehicle; a fluid connector to fluidically connect the drive module to the body module of the vehicle; or an air connector through which to provide temperature controlled air from the HVAC system of the drive module to the body module of the vehicle.

Q. A drive module for a vehicle, the drive module comprising: a drive module frame; first and second wheels; a propulsion system coupled to the drive module frame and to the first and second wheels to drive at least one of the first and second wheels; and a crash structure coupled to the drive module frame, the crash structure configured to crumple responsive to an impact force exceeding an impact threshold to absorb the impact force.

R. The drive module as paragraph Q recites, further comprising: one or more brackets to couple the crash structure to a body module of a vehicle, a first end of the one or more brackets being coupled to the crash structure and a second end of the one or more brackets being configured to couple to the body module, wherein the second end of the one or more brackets has a larger surface area than a surface area of the first end of the one or more brackets in order to distribute impact forces transferred by the crash structure to the larger surface area of the body module.

S. The drive module as any one of paragraphs Q or R recites, further comprising: a heating ventilation and air conditioning (HVAC) system disposed in or on the drive module frame to, when coupled to the vehicle, provide temperature controlled air to a passenger compartment of the vehicle; a power supply electrically coupled to the propulsion system and the HVAC system to provide power to the propulsion system and the HVAC system; and a drive module control system configured to control operation of the propulsion system and the HVAC system.

T. The drive module as any one of paragraphs Q-S recites, further comprising at least one of: a steering assembly coupled to the first and second wheels to steer the first and second wheels; a braking assembly coupled to the first and second wheels to brake the first and second wheels; a suspension assembly to movably couple the first and second wheels to the drive module frame; one or more exterior body panels or fascia of the vehicle; one or more exterior lights of the vehicle; or one or more sensors coupled to the drive module to sense objects in an environment surrounding the drive module.

U. The drive module as any one of paragraphs Q-T recites, wherein the drive module comprises a connection interface for coupling the drive module to a body module of a vehicle, the connection interface comprising: at least one of a guide protrusion or a receptacle to receive a guide protrusion; a mechanical connector to mechanically connect the drive module to the body module of the vehicle; and at least one of: an electrical connector to electrically connect the drive module to the body module of the vehicle; a fluid connector to fluidically connect the drive module to the body module of the vehicle; or an air connector through which to provide temperature controlled air from the HVAC system of the drive module to the body module of the vehicle.

V. A method of operating a vehicle that includes a body module having a passenger compartment of the vehicle, a first drive module that is removably coupled to a first end of the body module, and a second drive module that is removably coupled to a second end of the body module, the method comprising: operating the vehicle at least partially using the first drive module; detecting a fault of a component of the first drive module; responsive to detecting the fault of the component of the first drive module, deactivating the first drive module; and operating the vehicle using the second drive module while the first drive module is deactivated.

W. The method as paragraph V recites, wherein the fault of the component of the first drive module comprises a fault in: a drive motor of the first drive module; a battery of the first drive module; an inverter of the first drive module; a steering system of the first drive module; a suspension system of the first drive module; a braking system of the first drive module; one or more lights of the first drive module; a heating ventilation and air conditioning (HVAC) system of the first drive module; a DC/DC converter; a high voltage junction; a high voltage cable; a sensor; an exterior light; or a charging component.

X. The method as any one of paragraphs V or W recites, wherein detecting the fault of the component of the first drive module comprises: detecting that an output of a battery of the first drive module is outside a predetermined normal operating range; detecting that a charge state of a battery of the first drive module is outside a predetermined normal operating range; detecting that a temperature of a battery of the first drive module is outside a predetermined normal operating range; or detecting that an output of an inverter of the first drive module is outside a predetermined normal operating range.

Y. The method as any one of paragraphs V-X recites, wherein detecting the fault of the component of the first drive module comprises: sending a control signal to the first drive module to perform an operation; measuring a condition of the vehicle after sending the control signal; and determining that the condition of the vehicle after sending the control signal is outside an expected range for performing the operation.

Z. The method as any one of paragraphs V-Y recites, wherein: the control signal comprises a signal to control a drive motor of the first drive module, and the measuring the condition of the vehicle comprises measuring at least one of a velocity, acceleration, or rotational speed of a wheel of the vehicle; the control signal comprises a signal to control a steering system of the first drive module, and the measuring the condition of the vehicle comprises measuring a trajectory of the vehicle; the control signal comprises a signal to control a suspension system of the first drive module, and the measuring the condition of the vehicle comprises measuring a position or displacement of a structural element of the suspension system of the vehicle; the control signal comprises a signal to control a braking system of the first drive module, and the measuring the condition of the vehicle comprises measuring at least one of a velocity, acceleration, or rotational speed of a wheel of the vehicle; or the control signal comprises a signal to control a heating ventilation and air conditioning (HVAC) system of the first drive module, and the measuring the condition of the vehicle comprises measuring a temperature in the passenger compartment of the vehicle.

AA. The method as any one of paragraphs V-Z recites, wherein deactivating the first drive module comprises at least one of: electrically disconnecting a battery of the first drive module from the body module and the second drive module; or mechanically disengaging a drive motor of the first drive module from wheels of the first drive module.

BB. The method as any one of paragraphs V-AA recites, wherein: the vehicle comprises a bidirectional vehicle; and the method further comprises, responsive to deactivating the first drive module, changing a direction of travel of the vehicle from a first direction of travel to a second direction of travel substantially opposite the first direction of travel.

CC. The method as any one of paragraphs V-BB recites, further comprising at least one of: logging the fault in memory of the first drive module; transmitting the fault to a computing device of the body module; or transmitting the fault to a remote computing device.

DD. The method as any one of paragraphs V-CC recites, further comprising: bringing the vehicle to a stop; supporting the body module above a driving surface by one or more supports; disconnecting the first drive module from the body module; causing a third drive module to drive, under its own power, into position adjacent to the first end of the body module; and coupling the third drive module to the first end of the body module.

EE. The method as any one of paragraphs V-DD recites, further comprising: detecting that a voltage of a battery of the second drive module is lower than a voltage of a battery of the third drive module; electrically disconnecting the battery of the second drive module from the body module and the third drive module; operating the vehicle using the third drive module until the voltage of the battery of the third drive module is within a predetermined threshold of the voltage of the battery of the second drive module; and electrically reconnecting the battery of the second drive module to the body module and the third drive module responsive to the voltage of the third drive module being within the predetermined threshold of the voltage of the battery of the second drive module.

FF. A method of servicing a vehicle that includes a body module having a passenger compartment of the vehicle, a first drive module that is removably coupled to the body module at a first end of the body module, and a second drive module that is removably coupled to the body module at a second end of the body module, the method comprising: supporting the body module of the vehicle above a driving surface by one or more supports; disconnecting the first drive module from the body module; causing a third drive module to drive, under its own power, into position adjacent to the first end of the body module; and coupling the third drive module to the first end of the body module.

GG. The method as paragraph FF recites, wherein disconnecting the first drive module from the body module comprises: releasing a mechanical connection between the first drive module and the body module; and at least one of: causing the first drive module to drive, under its own power, away from the first end of the body module; or causing the second drive module to drive, under its own power, the body module away from the first drive module.

HH. The method as any one of paragraphs FF or GG recites, wherein causing the third drive module to drive, under its own power, into position adjacent to the first end of the body module is performed under control of at least one of: a vehicle controller of the body module; a remote control device; a teleoperations computing device; a computing device of an automated service robot; or a controller of the third drive module.

II. The method as any one of paragraphs FF-HH recites, further comprising: receiving a signal from an inertial sensor of the third drive module; and causing the third drive module to drive, under its own power, to align a coupler of the third drive module with a corresponding coupler at the first end of the body module based at least in part on the signal from the inertial sensor of the third drive module.

JJ. The method as any one of paragraphs FF-II recites, wherein coupling the third drive module to the first end of the body module comprises: aligning a coupler of the third drive module with a corresponding coupler at the first end of the body module; mechanically connecting the coupler of the third drive module with the corresponding coupler at the first end of the body module, wherein mechanically connecting the coupler of the third drive module with the corresponding coupler at the first end of the body module automatically establishes at least one of: a blind electrical connection between the third drive module and the body module; a blind fluid connection between the third drive module and the body module; or a blind air connection between the third drive module and the body module.

KK. The method as any one of paragraphs FF-JJ recites, wherein coupling the third drive module to the first end of the body module is performed automatically when the third drive module is brought within a predetermined proximity to the body module.

LL. The method as any one of paragraphs FF-KK recites, further comprising: detecting that a voltage of a battery of the second drive module is lower than a voltage of a battery of the third drive module; electrically disconnecting the battery of the second drive module from the body module and the third drive module; operating the vehicle using the third drive module until the voltage of the battery of the third drive module is within a predetermined threshold of the voltage of the battery of the second drive module.

MM. A drive module configured to be coupled to a body module of a vehicle, the drive module comprising: multiple components for operating the vehicle; one or more processors; one or more communication connections; and memory communicatively coupled to the one or more processors, the memory storing: a diagnostic module, executable by the one or more processors, to identify faults with one or more of the multiple components; and instructions that, when executed, configure the drive module to perform operations comprising: detecting connection of the drive module to the body module of the vehicle; and transmitting, by the one or more communication connections: an identifier of the drive module; and a fault log including indication of one or more faults identified by the diagnostic module.

NN. The drive module as paragraph MM recites, wherein the instructions configure the drive module to transmit the identifier of the drive module and the fault log to at least one of: a vehicle controller of the body module; a diagnostic computing device; or a teleoperation computing device.

OO. The drive module as any one of paragraphs MM or NN recites, wherein the multiple components comprise: a propulsion system for propelling the vehicle; a heating ventilation and air conditioning (HVAC) system for controlling air temperature within a passenger compartment of the vehicle; and an energy storage system to power the propulsion system and the HVAC system.

What is claimed is:

1. A drive module for a vehicle comprising:
a frame configured to couple a first end of the drive module to a portion of the vehicle;
a propulsion system to propel the vehicle;
a light source configured to emit light into to an environment proximate the vehicle;
a facia coupled to the first end of the drive module, the light source at least one of (i) coupled to the facia, or (ii) disposed in an opening in the facia; and
wherein a second end of the drive module is configured to be a distal end of the vehicle and the light source is disposed proximate the second end of the drive module.

2. The drive module of claim 1, wherein the light source is a direction indicator to signal a direction of travel of the vehicle.

3. The drive module of claim 1, wherein the light source comprises at least one of an indicator light, a sign, or a light array and is configured to indicate an action of the vehicle.

4. The drive module of claim 1, wherein the light source is positioned to emit light in a region generally in front or behind the vehicle, the light source being configured to act as a headlight and a taillight.

5. The drive module of claim 1, wherein the frame is configured to couple to the portion of the vehicle via a coupler comprising:
a mechanical connector to mechanically connect the drive module to the portion of the vehicle; and
at least one of:
an electrical connector to electrically connect the drive module to the portion of the vehicle; or
a fluid connector to fluidically connect the drive module to the portion of the vehicle.

6. A system comprising:
a propulsion system to propel a vehicle;
a light source configured to emit light into an environment proximate the vehicle;
a first end configured to be a distal end of the vehicle;
a facia coupled to the first end of a drive module, the light source at least one of (i) coupled to the facia, or (ii) disposed in an opening in the facia; and
a second end opposite the first end, the second end comprising a coupler to couple the drive module to a portion of the vehicle.

7. The system of claim 6, wherein the light source is configured to signal a direction of travel of the vehicle.

8. The system of claim 6, wherein the light source comprises an indicator light, a sign, or a light array.

9. The system of claim 6, wherein the light source is configured to act as a headlight and a taillight.

10. The system of claim 6, the system further comprising a body panel coupled to the first end, the body panel comprising an opening and the light source disposed in the opening in the body panel.

11. The system of claim 6, wherein the coupler comprises:
a mechanical connector to mechanically connect the system to the portion of the vehicle; and
at least one of:
an electrical connector to electrically connect the system to the portion of the vehicle; or
a fluid connector to fluidically connect the system to the portion of the vehicle.

12. The system of claim 11, wherein the mechanical connector comprises an alignment guide to align the system relative to the portion of the vehicle.

13. The system of claim 6, the system further comprising:
a first wheel and a second wheel,
wherein the propulsion system is further coupled to the first wheel and the second wheel to drive at least one of the first wheel or the second wheel.

14. The system of claim 6, further comprising a control system communicatively coupled to a vehicle computing device, the control system configured to control operation of the vehicle based at least in part on a signal received from the vehicle computing device.

15. The system of claim 14, wherein the vehicle comprises an autonomous vehicle and the vehicle computing device is configured to autonomously control operation of the autonomous vehicle.

16. The system of claim 6, further comprising a battery electrically coupled to the light source to power the light source.

17. The system of claim 6, wherein the portion of the vehicle comprises a body module, the body module further comprising an exterior light source for illuminating light into the environment of the vehicle.

18. The system of claim 6, further comprising one or more sensors disposed on an exterior of the system, the one or more sensors configured to sense an object in the environment.

19. The system of claim 6, wherein the light source comprises at least one of an indicator light, a sign, or a light array and is configured to indicate an action of the vehicle.

20. The drive module of claim 1, further comprising an alignment guide to align the system relative to the portion of the vehicle.

* * * * *